US011704918B2

(12) United States Patent
Purcell

(10) Patent No.: US 11,704,918 B2
(45) Date of Patent: Jul. 18, 2023

(54) RECONFIGURABLE INTEGRATED CIRCUITS FOR ADJUSTING CELL SORTING CLASSIFICATION

(71) Applicant: Becton, Dickinson and Company, Franklin Lakes, NJ (US)

(72) Inventor: Paul Barclay Purcell, Ouray, CO (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 354 days.

(21) Appl. No.: 16/917,461

(22) Filed: Jun. 30, 2020

(65) Prior Publication Data

US 2021/0012087 A1 Jan. 14, 2021

Related U.S. Application Data

(60) Provisional application No. 62/872,663, filed on Jul. 10, 2019.

(51) Int. Cl.
*G06V 20/69* (2022.01)
*G01N 21/17* (2006.01)
(Continued)

(52) U.S. Cl.
CPC .......... *G06V 20/698* (2022.01); *G01N 21/01* (2013.01); *G01N 21/17* (2013.01); *G01N 21/84* (2013.01);
(Continued)

(58) Field of Classification Search
CPC ..... G01N 2015/1006; G01N 2015/149; G01N 15/1459; G01N 15/147; G01N 15/1404;
(Continued)

(56) References Cited

U.S. PATENT DOCUMENTS 6,473,698 B1 * 10/2002 Albert .................. G06V 20/698
702/45
8,290,625 B2   10/2012 Degeal et al.
(Continued)

FOREIGN PATENT DOCUMENTS

WO   WO-2014062719 A2 *   4/2014   ........ B01L 3/502761
WO   WO-2017066544 A1 *   4/2017   ............ G01J 3/0208
(Continued)

*Primary Examiner* — Michael P Stafira
(74) *Attorney, Agent, or Firm* — Khin K. Chin; Bret E. Field; Bozicevic, Field & Francis LLP

(57) ABSTRACT

Aspects of the present disclosure include reconfigurable integrated circuits for characterizing particles of a sample in a flow stream. Reconfigurable integrated circuits according to certain embodiments are programmed to calculate parameters of a particle in a flow stream from detected light; compare the calculated parameters of the particle with parameters of one or more particle classifications; classify the particle based on the comparison between the parameters of the particle classifications and the calculated parameters of the particle; and adjust one or more parameters of the particle classifications based on the calculated parameters of the particle. Methods for characterizing particles in a flow stream with the subject integrated circuits are also described. Systems and integrated circuit devices programmed for practicing the subject methods, such as on a flow cytometer, are also provided.

19 Claims, 4 Drawing Sheets

(51) Int. Cl.
*G01N 21/01* (2006.01)
*G01N 21/84* (2006.01)
*G06N 3/08* (2023.01)

(52) U.S. Cl.
CPC ....... *G06N 3/08* (2013.01); *G01N 2021/0112* (2013.01); *G01N 2021/0181* (2013.01); *G01N 2021/0193* (2013.01); *G01N 2021/1765* (2013.01); *G01N 2021/845* (2013.01); *G01N 2201/125* (2013.01)

(58) Field of Classification Search
CPC ....... G01N 21/6428; G01N 2015/1415; G01N 33/5005; G01N 2015/0065; G01N 2021/6439; G01N 15/1468; G01N 33/48; G01N 2015/1406; G01N 21/63; G01N 15/1434; G01N 15/1429; G01N 2035/00326; G01N 15/1475; G01N 35/0092; G01N 2015/1486; G01N 2035/00495; G01N 33/54366; G01N 35/00; G01N 33/54306; G01N 35/1065; G01N 2015/0073; G01N 2015/008; G01N 2015/1493; G01N 35/10; G01N 33/56966; G01N 2015/1497; G01N 35/026; G01N 2015/142; G01N 35/00871; G01N 15/14; G01N 15/1484; G01N 21/645; G01N 2015/1409; G01N 2015/1477; G01N 21/64; G01N 2201/12; G01N 27/447; G01N 33/56972; G01N 35/1072; G01N 21/25; G01N 2015/1413; G01N 35/04; G01N 15/12; G01N 21/1702; G01N 2291/02416; G01N 2291/02809; G01N 2291/02836; G01N 29/222; G01N 33/56983; G01N 2035/00237; G01N 2035/0449; G01N 35/00069; G01N 2035/00306; G01N 2035/00356; G01N 33/80; G01N 35/1009; G01N 2035/00138; G01N 2035/00366; G01N 2035/00425; G01N 2035/0486; G01N 2035/0491; G01N 2201/024; G01N 2201/04; G01N 33/54313; G01N 33/92; G01N 35/00029; G01N 35/1011; G01N 2035/00148; G01N 2035/00435; G01N 2035/00633; G01N 2035/0474; G01N 2035/0493; G01N 2035/0494; G01N 21/27; G01N 33/62; G01N 33/6827; G01N 35/00623; G01N 2015/1447; G01N 2015/1402; G01N 33/5094; G01N 15/1436; G01N 2015/1452; G01N 33/5091; G01N 33/5308; G01N 2015/1445; G01N 33/5304; G01N 1/34; G01N 2015/1075; G01N 15/1425; G01N 2015/1481; G01N 33/505; G01N 33/56977; G01N 15/1012; G01N 15/1463; G01N 2333/70596; G01N 33/5032; G01N 33/5306; G01N 33/532; G01N 33/548; G01N 33/58; G01N 2015/1081; G01N 2800/7028; G01N 33/57492; G01N 2015/1025; G01N 2015/144; G01N 2015/1488; G01N 2800/50; G01N 21/6402; G01N 15/1056; G01N 21/6486; G01N 33/57415; G01N 2015/0084; G01N 2035/00881; G01N 2015/1018; G01N 2015/1443; G01N 2800/52; G01N 33/4833; G01N 15/0205; G01N 2015/0088; G01N 35/0094; G01N 2800/56; G01N 33/50; G01N 33/57423; G01N 33/5743; G01N 33/582; G01N 1/40; G01N 15/1427; G01N 2021/6441; G01N 2035/00277; G01N 2035/00891; G01N 2035/103; G01N 2201/06113; G01N 2333/70589; G01N 33/6863; G01N 35/00722; G01N 2035/1048; G01N 21/76; G01N 2333/70553; G01N 2800/22; G01N 33/487; G01N 33/53; G01N 35/0099; G01N 1/4077; G01N 15/0227; G01N 2015/145; G01N 2015/1472; G01N 2030/8827; G01N 21/07; G01N 21/17; G01N 30/02; G01N 33/5302; G01N 33/57426; G01N 33/6818; G01N 35/02; G01N 2001/4083; G01N 2015/0294; G01N 2015/1438; G01N 2015/1454; G01N 2015/1465; G01N 2015/1495; G01N 2035/1034; G01N 21/78; G01N 2333/705; G01N 30/88; G01N 33/569; G01N 35/085; G01N 15/06; G01N 15/10; G01N 15/1456; G01N 2001/2826; G01N 2015/0046; G01N 2015/0053; G01N 2015/1461; G01N 2021/3595; G01N 2021/513; G01N 2021/6417; G01N 2035/1076; G01N 21/01; G01N 21/3577; G01N 21/51; G01N 21/532; G01N 21/75; G01N 21/84; G01N 33/48707; G01N 33/49; G01N 33/491; G01N 33/4915; G01N 33/5011; G01N 33/543; G01N 33/559; G01N 33/564; G01N 33/566; G01N 33/574; G01N 33/57484; G01N 33/6803; G01N 33/86; G01N 1/28; G01N 1/30; G01N 15/0211; G01N 2015/0238; G01N 2015/025; G01N 2015/1411; G01N 2021/058; G01N 2021/825; G01N 2035/00158; G01N 2035/00465; G01N 2035/00811; G01N 2035/1039; G01N 2035/1051; G01N 21/0303; G01N 21/21; G01N 21/35; G01N 21/4133; G01N 21/65; G01N 22/00; G01N 2333/4709; G01N 2500/00; G01N 2500/04; G01N 27/44791; G01N 30/6069; G01N 30/6095; G01N 33/5026; G01N 33/534; G01N 33/357; G01N 33/54346; G01N 33/56988; G01N 33/573; G01N 33/57407; G01N 33/57488; G01N 33/6893; G01N 33/6896; G01N 35/00584; G01N 35/00732; G01N 35/0098; G01N 1/38; G01N 15/1431; G01N 2015/0288; G01N 2015/1037; G01N 2021/0112; G01N 2021/0181; G01N 2021/0193; G01N 2021/0353; G01N 2021/1725; G01N 2021/1765; G01N 2021/845; G01N 2030/0065; G01N 2035/00683; G01N 2035/00772; G01N 2035/0403; G01N 2035/0477; G01N 2035/1062; G01N 21/13; G01N 21/53; G01N 21/6408; G01N 21/6456; G01N 2201/021; G01N 2201/125; G01N 2223/419; G01N 23/046; G01N 2333/70514; G01N 2458/10; G01N 2500/10; G01N 2800/26; G01N 29/028; G01N 30/0005; G01N 33/02; G01N 33/483; G01N 33/493; G01N 33/497;

G01N 33/5002; G01N 33/5008; G01N
33/5023; G01N 33/5041; G01N 33/5047;
G01N 33/533; G01N 33/5432; G01N
33/5735; G01N 33/6854; G01N 35/08;
G01N 35/1074; G01N 35/1095; G01N
35/1097; G01N 1/10; G01N 1/2202;
G01N 13/00; G01N 15/02; G01N 15/042;
G01N 15/05; G01N 15/1031; G01N
2001/2223; G01N 2001/4038; G01N
2001/4094; G01N 2015/0069; G01N
2015/1043; G01N 2021/052; G01N
2021/4707; G01N 2021/4726; G01N
2021/7759; G01N 2021/8557; G01N
2030/0035; G01N 2030/007; G01N
2030/065; G01N 21/05; G01N 21/4788;
G01N 21/6445; G01N 21/66; G01N
21/85; G01N 2201/10; G01N 2201/129;
G01N 2223/345; G01N 2333/161; G01N
2333/195; G01N 2333/445; G01N
2333/52; G01N 2333/70503; G01N
2333/7051; G01N 2333/70517; G01N
2333/70539; G01N 2333/71; G01N
2405/00; G01N 2405/04; G01N 2405/08;
G01N 2570/00; G01N 27/44717; G01N
27/44743; G01N 27/44769; G01N 27/62;
G01N 27/622; G01N 27/624; G01N
2800/104; G01N 2800/367; G01N 29/46;
G01N 3/00; G01N 30/60; G01N 30/724;
G01N 31/227; G01N 33/00; G01N
33/48735; G01N 33/4875; G01N
33/5052; G01N 33/5073; G01N 33/542;
G01N 33/54326; G01N 33/54333; G01N
33/54353; G01N 33/54386; G01N
33/57434; G01N 33/68; G01N 33/6845;
G01N 33/6848; G01N 33/6851; G01N
33/6872; G01N 33/6878; G01N 33/72;
G01N 35/1016; G01N 37/00; G01N 9/00;
G01N 9/36; G01N 21/9027; G01N
21/8851; G01N 21/31; G01N 2015/1087;
G01N 15/00; G01N 33/15; G01N 1/08;
G01N 16/06; G01N 2015/0038; G01N
2021/5903; G01N 21/47; G01N 21/554;
G01N 21/9009; G01N 21/9018; G01N
2015/0693; G01N 23/2251; G01N
33/587; G01N 2015/0076; G01N
2021/8867; G01N 2021/8887; G01N
2021/95615; G01N 2035/00455; G01N
21/00; G01N 21/4738; G01N 21/49;
G01N 21/9501; G01N 21/95607; G01N
2201/124; G01N 2223/07; G01N
2223/418; G01N 2223/505; G01N
2223/6116; G01N 2223/66; G01N 33/24;
G01N 19/08; G01N 2035/1041; G01N
21/636; G01N 21/68; G01N 21/9036;
G01N 2201/068; G01N 2333/165; G01N
27/327; G01N 33/56911; G01N 33/6884;
G01N 3/045; G01N 3/08; G01N 20/00;
G01N 3/084; G01N 7/01; G01N 3/047;
G01N 3/04; G01N 3/088; G01N 3/006;
G01N 3/044; G01N 20/10; G01N 3/049;
G01N 3/02; G01N 20/20; G01N 3/126;
G01N 5/01; G01N 3/048; G01N 5/046;
G01N 3/008; G01N 3/042; G01N 3/043;
G01N 3/086; G01N 5/04; G01N 5/043;
G01N 5/047; G01N 3/063; G01N 5/02;
G01N 5/048; G06V 20/69; G06V 20/698;
G06V 10/764; G06V 10/82; G06V
10/431; G06V 20/693; G06V 20/695;
G06V 10/143; G06V 2201/03; G06V
10/20; G06V 10/449; G06V 10/454;
G06V 20/64; G06V 10/774; G06V 20/52;
G06V 2201/032; G06V 10/26; G06V
2201/06; G06V 10/25; G06V 10/776;
G06V 30/194; G06V 10/145; G06V
10/243; G06V 10/42; G06V 2201/02;
G06V 2221/031; G06V 2201/07; G06V
10/44; G06V 10/7715; G06V 20/46;
G06V 20/56; G06V 30/413; G06V 10/10;
G06V 10/16; G06V 10/462; G06V 10/70;
G06V 10/751; G06V 10/7747; G06V
20/10; G06V 20/41; G06V 30/19173;
G06V 30/274; G06V 40/15; G06V
40/168; G06V 40/172; G06V 10/22;
G06V 10/255; G06V 10/267; G06V
10/62; G06V 10/753; G06V 10/761;
G06V 10/762; G06V 10/7792; G06V
10/80; G06V 10/806; G06V 10/98; G06V
20/188; G06V 20/40; G06V 20/44; G06V
20/58; G06V 20/653; G06V 30/412;
G06V 40/10; G06V 40/103; G06V
40/171; G06V 40/178

See application file for complete search history.

(56) References Cited

U.S. PATENT DOCUMENTS

| | | | | |
|---|---|---|---|---|
| 2002/0029235 | A1* | 3/2002 | Lock | G06F 18/2321 |
| | | | | 708/814 |
| 2017/0261930 | A1* | 9/2017 | Mathuis | G06F 16/51 |
| 2017/0268981 | A1* | 9/2017 | Diebold | G01N 15/147 |
| 2018/0095450 | A1* | 4/2018 | Lappas | G06T 19/00 |
| 2018/0246027 | A1* | 8/2018 | Vacca | G01N 15/14 |
| 2018/0286038 | A1 | 10/2018 | Jalali et al. | |
| 2019/0331586 | A1* | 10/2019 | Trotter | G01N 15/1425 |
| 2020/0309664 | A1* | 10/2020 | Bahr | G01N 15/0227 |

FOREIGN PATENT DOCUMENTS

| | | | | | |
|---|---|---|---|---|---|
| WO | WO2017214572 | A1 | | 12/2017 | |
| WO | WO-2019074849 | A1 | * | 4/2019 | G01N 15/1012 |
| WO | WO-2019199499 | A1 | * | 10/2019 | B01L 3/502715 |

* cited by examiner

RECONFIGURABLE INTEGRATED CIRCUITS FOR ADJUSTING CELL SORTING CLASSIFICATION

CROSS-REFERENCE TO RELATED APPLICATION

This application is related to U.S. Provisional Patent Application Ser. No. 62/872,663 filed Jul. 10, 2019; the disclosure of which application is herein incorporated by reference.

INTRODUCTION

Light detection can be used to characterize components of a sample (e.g., biological samples), for example when the sample is used in the diagnosis of a disease or medical condition. When a sample is irradiated, light can be scattered by the sample, transmitted through the sample as well as emitted by the sample (e.g., by fluorescence). Variations in the sample components, such as morphologies, absorptivity and the presence of fluorescent labels may cause variations in the light that is scattered, transmitted or emitted by the sample. These variations can be used for characterizing and identifying the presence of components in the sample. To quantify these variations, the light is collected and directed to the surface of a detector.

One technique that utilizes light detection to characterize the components in a sample is flow cytometry. Using data generated from the detected light, distributions of the components can be recorded and where desired material may be sorted. To sort particles in the sample, a drop charging mechanism charges droplets of the flow stream containing a particle type to be sorted with an electrical charge at the break-off point of the flow stream. Droplets are passed through an electrostatic field and are deflected based on polarity and magnitude of charge on the droplet into one or more collection containers. Uncharged droplets are not deflected by the electrostatic field.

SUMMARY

Aspects of the present disclosure include reconfigurable integrated circuits for characterizing particles of a sample in a flow stream. Reconfigurable integrated circuits according to certain embodiments are programmed to calculate parameters of a particle in a flow stream from detected light; compare the calculated parameters of the particle with parameters of one or more particle classifications; classify the particle based on the comparison between the parameters of the particle classifications and the calculated parameters of the particle; and adjust one or more parameters of the particle classifications based on the calculated parameters of the particle. Methods for characterizing particles in a flow stream with the subject integrated circuits are also described. Systems and integrated circuit devices programmed for practicing the subject methods, such as on a flow cytometer, are also provided.

Integrated circuit devices of interest may include, in certain instances, a reconfigurable field programmable gate array (FPGA), an application specific integrated circuit (ASIC) or a complex programmable logic device (CPLD). In some embodiments, the particle classifications programmed into the reconfigurable integrated circuits include sort classifications (e.g., for sorting a cell with a cell sorting device). In some instances, classifying the particle includes generating a particle sort decision. In certain instances, the integrated circuit is programmed to generate the particle sorting decision based on a threshold between the calculated parameters of the particle and the parameters of the particle classifications. In some embodiments, the integrated circuit is programmed to adjust one or more parameters of the particle classifications by changing a threshold for generating the particle sort decision. The threshold may be a predetermined threshold, a user-configurable threshold that can be adjusted by user input or is a dynamic threshold that is adjusted based on calculated parameters of the particle. Where the threshold is a dynamic threshold that is adjusted based on calculated parameters of the particle, the integrated circuit may be programmed with an algorithm that updates the threshold for generating the sort decision. This algorithm may be a static predetermined algorithm, a user-configurable algorithm or a dynamic algorithm that updates based on calculated parameters of the particle. For example, the dynamic algorithm may be a machine-learning algorithm that updates based on calculated parameters of the particle and parameters of particles having similar or different classification parameters.

In other embodiments, the particle classifications programmed into the reconfigurable integrated circuits include one or more particle population clusters. In these embodiments, the integrated circuit is programmed to classify the particle by assigning the particle to a particle cluster based on the comparison between a classification parameters of each particle cluster and the calculated parameters of the particle. In some instances, the integrated circuit is programmed to adjust one or more parameters of the particle classifications by changing the classification parameters of the assigned particle cluster based on the calculated parameters of the particle. In these instances, the integrated circuit may also include programming to plot the calculated parameters of the particle on a scatter plot. In other instances, the integrated circuit may also include programming to generate a list of the calculated parameters of the particle. In some embodiments, the integrated circuit includes hardware circuitry (e.g., digital circuitry) for customized operators. In certain instances, the customized operators include one or more sum operators, multiply operators and compare operators. In some embodiments, the integrated circuit is programmed with one or more sum operators. In other embodiments, the integrated circuit is programmed with one or more multiply operators. In yet other embodiments, the integrated circuit is programmed with one or more compare operators. In still other embodiments, the integrated circuit is programmed with two or more of a sum operator, a multiply operator and a compare operator. In certain instances, the integrated circuit is programmed with a sum operator, a multiply operator and a compare operator.

The integrated circuit is, in some embodiments, programmed to calculate a statistical probability of the particle being assigned to a particle cluster. For example, the integrated circuit may be programmed to calculate a Mahalanobis distance between the calculated parameters of the particle and each particle cluster. In other embodiments, the integrated circuit is programmed to assign the particle to a particle cluster based on a threshold between the calculated parameters of the particle and the classification parameters of a particle cluster. For example, the threshold may be an overlap between the calculated parameters of the particle and the classification parameters of the particle cluster. This threshold may be a predetermined threshold, a user-configurable threshold or a dynamic threshold that changes in response to assigning the particle to the particle cluster. In some instances, the integrated circuit is programmed to adjust the threshold based on the classification parameters of the assigned particle cluster and the calculated parameters of the particle. The integrated circuit may be programmed to adjust the threshold with a static predetermined algorithm, a user-configurable algorithm or a dynamic algorithm that updates the classification parameters of the assigned particle cluster with the calculated parameters of the particle. For example, the dynamic algorithm may be a machine-learning algorithm which updates the classification parameters of the particle cluster based on calculated parameters of the particle and parameters of particles having similar or different classification parameters.

Aspects of the present disclosure also include methods for characterizing particles of a sample in a flow stream. Methods according to certain embodiments, include detecting light from a sample having particles in a flow stream; calculating parameters of a particle in the sample from the detected light; comparing the calculated parameters of the particle with parameters of one or more particle classifications; classifying the particle based on the comparison between the parameters of the particle classifications and the calculated parameters of the particle; and adjusting one or more parameters of the particle classifications based on the calculated parameters of the particle.

In embodiments, light is detected from a sample having particles in an interrogation region of a flow stream. In some embodiments, the particle is a cell, such as a cell in a biological sample. Methods according to certain embodiments include detecting light with one or more of: 1) a brightfield photodetector to generate a brightfield data signal; 2) a scattered light detector (e.g., a forward scatter detector or a side scatter detector) to generate a scatter data signal; and 3) a fluorescence detector to generate a fluorescence data signal. In embodiments, light detected from a particle in the sample is used to calculate parameters of the particle. For instance, in one example methods include calculating scattered light parameters, such as forward scatter light intensity or side scatter light intensity. In another example, methods include calculating fluorescence parameters, such as fluorescence intensity of one or more fluorophores. In certain embodiments, the fluorophores are associated (e.g., covalently bonded) to an analyte-binding compound, such as an antibody.

In some embodiments, methods include generating a sort classification. In these embodiments, the sort classification may be a particle sorting decision. In some instances, the method includes generating the particle sort decision based on a threshold between the calculated parameters of the particle and the parameters of the particle classifications. In certain instances, adjusting one or more parameters of the particle classifications include changing a threshold for generating the particle sort decision. The threshold may be a predetermined threshold, a user configurable threshold or a dynamic threshold that is adjusted based on the calculated parameters of the particle. Where the threshold is a dynamic threshold, the threshold may be updated by an algorithm (e.g., an algorithm programmed into a reconfigurable integrated circuit) for generating a sort decision. The algorithm may be a static, predetermined algorithm, a user-configurable algorithm or a dynamic algorithm that updates the sort decision based on the calculated parameters of the particle and the parameters of the particle sorting gate. For example, the dynamic algorithm may be a machine-learning algorithm which updates the sort classification parameters based on calculated parameters of the particle and parameters of particles previously sorted with the sorting gate.

In some embodiments, one or more of the calculated parameters of the particle may be plotted, such as on a scatter plot. In other embodiments, a list of one or more of the calculated parameters is generated. The calculated parameters of the particle is compared to classification parameters of one or more groups of particles, such as a particle cluster to identify the extent of its association with the particle cluster. For example, the comparison between the calculated parameters of the particle and the classification parameters of the particle cluster may include determining that the particle is a particle having one or more properties that fall within the particle cluster. In other instances, the comparison between the calculated parameters and the classification parameters of the particle cluster includes determining that the particle is the same as the particles within the particle cluster. In yet other instances, the comparison between the calculated parameters and the classification parameters of the particle cluster includes determining that the particle is associated (e.g., covalently bonded) with a fluorophore that is the same as the particles within the particle cluster. In still other instances, the comparison between the calculated parameters and the classification parameters of the particle cluster includes determining that the particle is associated (e.g., covalently bonded) with an analyte-specific binding member that is the same as the particles within the particle cluster. In still other instances, the comparison between the calculated parameters and the classification parameters of the particle cluster includes calculating a statistical probability of the particle being assigned to the particle cluster. In one example, the comparison between the calculated parameters and the classification parameters of the particle cluster includes calculating a Mahalanobis distance between the calculated parameters of the particle and the particle cluster.

Methods according to embodiments include assigning the particle to a particle cluster based on the comparison between the classification parameters of each particle cluster and the calculated parameters of the particle. In some embodiments, the particle is assigned to a particle cluster based on a threshold between the calculated parameters of the particle and the classification parameters of a particle cluster. In some instances, the threshold is an overlap between the calculated parameters of the particle and the classification parameters of the particle cluster. In certain instances, the threshold is a predetermined threshold. In other instances, the threshold is a user-configurable threshold. In still other instances, the threshold is a dynamic threshold that changes in response to assigning the particle to the particle cluster. In some embodiments, methods further include adjusting the threshold based on the classification parameters of the assigned particle cluster and the calculated parameters of the particle. In certain embodiments, the threshold is adjusted by a processor having memory operably coupled to the processor where the memory has an algorithm that updates the classification parameters of the assigned particle cluster with the calculated parameters of the particle. In some instances, the algorithm is a machine-learning algorithm. In other instances, the algorithm is a static predetermined algorithm. In yet other instances, the algorithm is a user-configurable algorithm. In still other instances, the algorithm is a dynamic algorithm that changes in response to the calculated parameters of a particle, such as a particle assigned to the particle cluster.

In certain embodiments, methods further include generating the one or more particle clusters for a sample. Methods according to certain embodiments include detecting light from a plurality of particles of a sample in a flow stream, calculating parameters of each particle from the detected light and clustering together particles based on the calculated parameters. In these embodiments, each particle assigned to a particle cluster may result in a change in the classification parameters of the particle cluster such that the classification parameters are dynamic and change based on the specific calculated parameters of each assigned particle. Each particle cluster may include 5 or more assigned particles, such as 10 or more assigned particles, such as 50 or more assigned particles, such as 100 or more assigned particles, such as 500 assigned particles and including 1000 assigned particles. In certain embodiments, the particle cluster is a grouping of rare events (e.g., rare cells in a sample, such as cancer cells) and may include 10 or less assigned particles, such as 9 or less and including 5 or less assigned particles.

In some embodiments, methods further include generating a sorting decision based on the assignment of a particle to a particle cluster. In some embodiments, the particle is sorted based on the statistical probability that the particle is a part of the particle cluster. In other embodiments, the particle is sorted based on the Mahalanobis distance on a scatter plot between the particle and particle cluster. In certain embodiments, methods include sorting the particle based on the generated sorting decision.

Aspects of the present disclosure also include systems having a light detection system for characterizing particles of a sample in a flow stream (e.g., cells in a biological sample). Systems according to certain embodiments include a light source configured to irradiate a sample having particles in a flow stream; a light detection system having a photodetector; and a processor with memory operably coupled to the processor where the memory has instructions stored thereon, which when executed by the processor, cause the processor to: calculate parameters of a particle in a flow stream from detected light; compare the calculated parameters of the particle with parameters of one or more particle classifications; classify the particle based on the comparison between the parameters of the particle classifications and the calculated parameters of the particle; and adjust one or more parameters of the particle classifications based on the calculated parameters of the particle.

In some embodiments, the particle classifications programmed into the processor memory of the subject systems include sort classifications (e.g., for sorting a cell with a cell sorting device). In some instances, classifying the particle includes generating a particle sort decision. In certain instances, the memory includes instructions stored thereon, which when executed by the processor, cause the processor to generate the particle sorting decision based on a threshold between the calculated parameters of the particle and the parameters of the particle classifications. In some embodiments, the memory includes instructions stored thereon, which when executed by the processor, cause the processor to adjust one or more parameters of the particle classifications by changing a threshold for generating the particle sort decision. The threshold may be a predetermined threshold, a user-configurable threshold that can be adjusted by user input or is a dynamic threshold that is adjusted based on calculated parameters of the particle. Where the threshold is a dynamic threshold that is adjusted based on calculated parameters of the particle, the memory may include an algorithm that updates the threshold for generating the sort decision. This algorithm may be a static predetermined algorithm, a user-configurable algorithm or a dynamic algorithm that updates based on calculated parameters of the particle. For example, the dynamic algorithm may be a machine-learning algorithm that updates based on calculated parameters of the particle and parameters of particles having similar or different classification parameters.

In other embodiments, the particle classifications programmed into the processor memory of the subject systems include one or more particle population clusters. In these embodiments, the memory includes instructions stored thereon, which when executed by the processor, cause the processor to classify the particle by assigning the particle to a particle cluster based on the comparison between a classification parameters of each particle cluster and the calculated parameters of the particle. In some instances, the memory includes instructions stored thereon, which when executed by the processor, cause the processor to adjust one or more parameters of the particle classifications by changing the classification parameters of the assigned particle cluster based on the calculated parameters of the particle. In these instances, the memory includes instructions stored thereon, which when executed by the processor, cause the processor to plot the calculated parameters of the particle on a scatter plot. In other instances, the memory includes instructions stored thereon, which when executed by the processor, cause the processor to generate a list of the calculated parameters of the particle. In some embodiments, the memory includes hardware circuitry (e.g., digital circuitry) for customized operators. In certain instances, the customized operators include one or more sum operators, multiply operators and compare operators. In some embodiments, the memory is programmed with one or more sum operators. In other embodiments, the memory is programmed with one or more multiply operators. In yet other embodiments, the memory is programmed with one or more compare operators. In still other embodiments, the memory is programmed with two or more of a sum operator, a multiply operator and a compare operator. In certain instances, the memory is programmed with a sum operator, a multiply operator and a compare operator.

In certain instances, the memory includes instructions stored thereon, which when executed by the processor, cause the processor to calculate a statistical probability of the particle being assigned to a particle cluster. For example, systems may be configured to calculate a Mahalanobis distance between the calculated parameters of the particle and each particle cluster. In other embodiments, systems are configured to assign the particle to a particle cluster based on a threshold between the calculated parameters of the particle and the classification parameters of a particle cluster. For example, the threshold may be an overlap between the calculated parameters of the particle and the classification parameters of the particle cluster. This threshold may be a predetermined threshold, a user-configurable threshold or a dynamic threshold that changes in response to assigning the particle to the particle cluster. In some instances, the memory includes instructions stored thereon, which when executed by the processor, cause the processor to adjust the threshold based on the classification parameters of the assigned particle cluster and the calculated parameters of the particle. The threshold may be a static predetermined algorithm, a user-configurable algorithm or a dynamic algorithm that updates the classification parameters of the assigned particle cluster with the calculated parameters of the particle. For example, the dynamic algorithm may be a machine-learning algorithm which updates the classification parameters of the particle cluster based on calculated parameters of the particle and parameters of particles having similar or different classification parameters.

In some embodiments, the memory includes instructions stored thereon, which when executed by the processor, cause the processor to plot the calculated parameters of the particle on a scatter plot or to generate a list of the calculated parameters of the particle. In embodiments, the system is configured to compare the calculated parameters of the particle with classification parameters of one or more groups of particles (e.g., particles in a particle cluster on a scatter plot). In some instances, the system is configured to identify the extent of the particle association with a particle cluster. In some embodiments, systems include memory having instructions stored thereon, which when executed by the processor, cause the processor to determine that the particle is a particle having one or more properties that fall within the particle cluster. In other instances, the system is configured to determine that the particle is the same as the particles within the particle cluster. In yet other instances, the system is configured to determine that the particle is associated (e.g., covalently bonded) with a fluorophore that is the same as the particles within the particle cluster. In still other instances, the system is configured to determine that the particle is associated (e.g., covalently bonded) with an analyte-specific binding member that is the same as the particles within the particle cluster. In still other instances, the system includes memory having instructions stored thereon, which when executed by the processor, cause the processor to calculate a statistical probability of the particle being assigned to a particle cluster. In one example, the system includes memory having instructions stored thereon, which when executed by the processor, cause the processor to calculate a Mahalanobis distance between the calculated parameters of the particle and a particle cluster.

In embodiments, systems of interest include a processor having memory operably coupled to the processor where the memory includes instructions stored thereon, which when executed by the processor, cause the processor to assign the particle to a particle cluster based on a comparison between the classification parameters of a particle cluster and the calculated parameters of the particle. In some embodiments, the system is configured to assign the particle to a particle cluster based on a threshold between the calculated parameters of the particle and the classification parameters of a particle cluster. In some instances, the threshold is an overlap between the calculated parameters of the particle and the classification parameters of the particle cluster. In certain instances, the threshold is a predetermined threshold. In other instances, the threshold is a user-configurable threshold. In still other instances, the threshold is a dynamic threshold that changes in response to assigning the particle to the particle cluster. In some embodiments, systems of interest include a processor having memory with an algorithm for adjusting the threshold based on the classification parameters of the assigned particle cluster and the calculated parameters of the particle. In these embodiments, the algorithm updates the classification parameters of the particle cluster with the calculated parameters of the newly particle. In some instances, the algorithm is a machine-learning algorithm. In other instances, the algorithm is a static predetermined algorithm. In yet other instances, the algorithm is a user-configurable algorithm. In still other instances, the algorithm is a dynamic algorithm that changes in response to the calculated parameters of a particle, such as a particle assigned to the particle cluster.

In certain embodiments, systems of interest include a processor having memory operably coupled to the processor where the memory includes instructions stored thereon, which when executed by the processor, cause the processor to generate one or more particle clusters (e.g., on a scatter plot) for a sample. In these embodiments, the system is configured to detect light from a plurality of particles of the sample in a flow stream, calculate parameters of each particle from the detected light and cluster together particles based on the calculated parameters. In some embodiments, the system is configured to change the classification parameters of a particle cluster based on the calculated parameters of a newly assigned particle.

In some embodiments, systems of interest may include one or more sort decision modules configured to generate a sorting decision for the particle based on the assignment of the particle to a particle cluster. In certain embodiments, systems further include a particle sorter (e.g., having a droplet deflector) for sorting the particles from the flow stream based on the sort decision generated by the sort decision module.

BRIEF DESCRIPTION OF THE FIGURES

The invention may be best understood from the following detailed description when read in conjunction with the accompanying drawings. Included in the drawings are the following figures.

DETAILED DESCRIPTION

Figure 1:
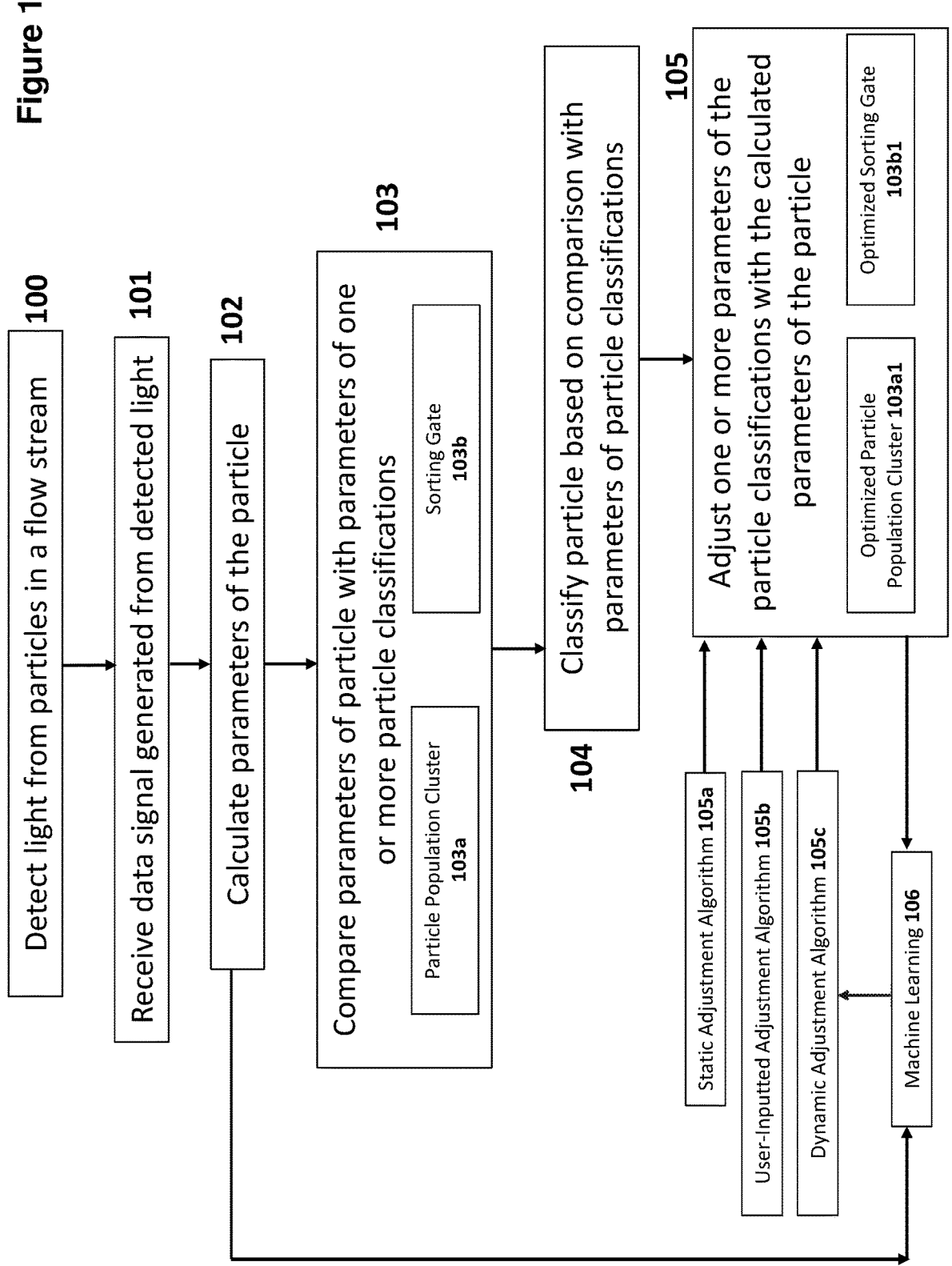
FIG. 1 depicts a flow chart for classifying a particle and adjusting one or more parameters of particle classifications according to certain embodiments.

Aspects of the present disclosure include reconfigurable integrated circuits for characterizing particles of a sample in a flow stream. Reconfigurable integrated circuits according to certain embodiments are programmed to calculate parameters of a particle in a flow stream from detected light; compare the calculated parameters of the particle with parameters of one or more particle classifications; classify the particle based on the comparison between the parameters of the particle classifications and the calculated parameters of the particle; and adjust one or more parameters of the particle classifications based on the calculated parameters of the particle. Methods for characterizing particles in a flow stream with the subject integrated circuits are also described. Systems and integrated circuit devices programmed for practicing the subject methods, such as on a flow cytometer, are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides reconfigurable integrated circuit devices for characterizing a particle of a sample in a flow stream. In further describing embodiments, reconfigurable (i.e., reprogrammable) integrated circuits (e.g., FPGA, ASIC, CPLD) having programming for calculating parameters of a particle, comparing the calculated parameters of the particle with one or more particle classifications (e.g., sorting gate classification), classifying the particle and adjusting one or more parameters of the particle classifications are first described in greater detail. Next, methods for classifying (e.g., particle cluster association, sorting classification) a particle based on calculated parameters of the particle from detected light are described. Systems, such as flow cytometry systems, for practicing the subject methods are also provided.

Reconfigurable Integrated Circuit Devices

As summarized above, aspects of the present disclosure include reconfigurable integrated circuit devices programmed for classifying a particle in a sample of a flow stream and adjusting the parameters of the particle classification based on the calculated parameters of the particle. The term "reconfigurable" is used herein in its conventional sense to refer to integrated circuit devices which can be reprogrammed one or more times, such as in response to adjustments to the parameters of the particle classifications as described in greater detail below. In some embodiments, the integrated circuit device is configured for user-reprogramming where adjustments to particle classification (e.g., sort decision classification, population cluster grouping) parameters is carried out by user. User-reprogramming, according to some embodiments, includes user inputted adjustments to the particle classification parameters (e.g., manual programming adjustments). In other embodiments, user-reprogramming includes a user inputted algorithm which adjusts parameters of particle classification automatically in response to calculated parameters of the particle and current particle classification parameters.

In certain embodiments, the integrated circuit is configured for dynamic reprogramming, such as where the integrated circuit is reprogrammed based on machine learning. The term "machine learning" is used herein in its conventional sense to refer to adjustments to the programming of the integrated circuit by computational methods that ascertain and implement information directly from data without relying on a predetermined equation as a model. In certain embodiments, machine learning includes learning algorithms which find patterns in data signals (e.g., from a plurality of particles in the sample). In these embodiments, the learning algorithm is configured to generate better and more accurate decisions and predictions as a function of the number of data signals (i.e., the learning algorithm becomes more robust as the number of characterized particles from the sample increases). Machine-learning protocols of interest may include, but are not limited to artificial neural networks, decision tree learning, decision tree predictive modeling, support vector machines, Bayesian networks, dynamic Bayesian networks, genetic algorithms among other machine learning protocols.

In embodiments, the subject integrated circuit devices are programmed to receive a data signal from one or more of a brightfield photodetector, a light scatter (forward scatter, side scatter) detector and a fluorescence photodetector; calculate parameters of a particle in a flow stream from data signal; compare the calculated parameters of the particle with parameters of one or more particle classifications; classify the particle based on the comparison between the parameters of the particle classifications and the calculated parameters of the particle; and adjust one or more parameters of the particle classifications based on the calculated parameters of the particle. In embodiments, the integrated circuit device is programmed to receive data signals from one or more light detectors (e.g., one or more detection channels), such as 2 or more, such as 3 or more, such as 4 or more, such as 5 or more, such as 6 or more and including 8 or more light detectors (e.g., 8 or more detection channels). Integrated circuit devices of interest may include, in certain instances, a field programmable gate array (FPGA), an application specific integrated circuit (ASIC) or a complex programmable logic device (CPLD).

In embodiments, the calculated parameters of the particle used to classify the particle (e.g., associate with a cluster population, generate a sort decision) may include one or more of the phase, intensity or wavelength of transmitted light (as determined by a brightfield photodetector), of forward light scatter from the particle, side light scatter from the particle, and from fluorescence light. In some embodiments, the calculated parameters of the particle used to classify the particle according to embodiments of the present disclosure include one or more determined properties of the particle, such as the size, center of mass or eccentricity of the particle. In yet other embodiments, the parameters of the particle used to classify the particle include frequency-encoded fluorescence data or calculated spatial data of the particle.

In some embodiments, the particle classifications programmed into the reconfigurable integrated circuits include sort classifications (e.g., for sorting a cell with a cell sorting device). The term "sorting" is used herein in its conventional sense to refer to separating components (e.g., droplets containing cells, droplets containing non-cellular particles such as biological macromolecules) of a sample and in some instances, delivering the separated components to one or more sample collection containers. For example, the particle classification may include sorting gates for sorting 2 or more components of the sample, such as 3 or more components, such as 4 or more components, such as 5 or more components, such as 10 or more components, such as 15 or more components and including sorting 25 or more components of the sample.

In some instances, classifying the particle includes generating a particle sort decision. In some instances, a particular subpopulation of particles (e.g., single cells) is classified by "gating" based on the calculated parameters of the particle. In certain instances, the integrated circuit is programmed to generate the particle sorting decision (e.g., identifying a desired sorting gate) based on an overlap between the calculated parameters of the particle and the parameters of the particle classifications. To select an appropriate gate, the reconfigurable integrated circuit may be programmed to plot the parameters (e.g., on a scatter plot) so as to obtain the best separation of subpopulations possible. In certain embodiments, the reconfigurable integrated circuit is programmed to plot forward light scatter (FSC) vs. side (i.e., orthogonal) light scatter (SSC) on a two-dimensional dot plot. In yet other embodiments, the reconfigurable integrated circuit is programmed to plot one or more of the determined properties (e.g., size, center of mass, eccentricity) against one or more of forward light scatter (FSC) and side (i.e., orthogonal) light scatter (SSC). In still other embodiments, the reconfigurable integrated circuit is programmed to gate the population of particles for forward light scatter (FSC) and side (i.e., orthogonal) light scatter (SSC), followed by gating based on one or more of the determined properties (e.g., size, center of mass, eccentricity) of the particle. A subpopulation of objects is then selected (i.e., those single cells within the gate) and particles that are not within the gate are excluded. Only those particles within the classification parameters are then further analyzed such as by plotting the other parameters for these classified particles.

In some embodiments, the integrated circuit is programmed to adjust one or more parameters of the particle classifications by changing a threshold for generating the particle sort decision. For example, the integrated circuit may be reprogrammed to change the parameter thresholds of a sorting gate for sorting particles of the sample. In some embodiments, the threshold is a predetermined threshold. In other embodiments, the threshold is a user configurable threshold. In still other embodiments, the threshold is a dynamic threshold that is adjusted based on the calculated parameters of the particle.

Where the threshold is a dynamic threshold that is adjusted based on calculated parameters of the particle, the integrated circuit may be programmed with an algorithm that updates the threshold for generating the sort decision In some embodiments, the algorithm that is programmed into the integrated circuit for updating the threshold is a static, predetermined algorithm. In other embodiments, the algorithm that is programmed into the integrated circuit for updating the threshold is a user configurable algorithm. In still other embodiments, the algorithm that is programmed into the integrated circuit for updating the threshold is a dynamic algorithm that updates the sort decision based on the calculated parameters of the particle and the parameters of the particle sorting gate. For example, the dynamic algorithm may be a machine-learning algorithm that updates based on calculated parameters of the particle and parameters of particles having similar or different classification parameters.

In other embodiments, the particle classifications programmed into the reconfigurable integrated circuits include one or more particle population clusters. In these embodiments, the integrated circuit is programmed to classify the particle by assigning the particle to a particle cluster based on the comparison between classification parameters of each particle cluster and the calculated parameters of the particle. In some embodiments, the subject integrated circuits are configured to generate one or more particle clusters based on the determined parameters of the particles in the sample. In these embodiments, the integrated circuit device is programmed to receive data signals generated from detected light from a plurality of particles of a sample in a flow stream, calculate parameters of each particle from the detected light and clustering together particles based on the calculated parameters. In these embodiments, each particle assigned to a particle cluster may result in a change in the classification parameters of the particle cluster such that the classification parameters are dynamic and change based on the specific calculated parameters of each assigned particle. The integrated circuit device can be programmed to assign any number of particles to a particle cluster, including 5 or more particles, such as 10 or more particles, such as 50 or more particles, such as 100 or more particles, such as 500 particles and including 1000 particles. In certain embodiments, the integrated circuit is programmed to group together in a particle cluster rare events (e.g., rare cells in a sample, such as cancer cells) detected in the sample. In these embodiments, the particle clusters generated by the integrated circuit may include 10 or less assigned particles, such as 9 or less and including 5 or less assigned particles.

In some instances, the integrated circuit is programmed to adjust one or more parameters of the particle classifications by changing the classification parameters of the assigned particle cluster based on the calculated parameters of the particle. In these instances, the integrated circuit may also include programming to plot the calculated parameters of the particle on a scatter plot. In other instances, the integrated circuit may also include programming to generate a list of the calculated parameters of the particle. In some embodiments, the integrated circuit includes hardware circuitry (e.g., digital circuitry) for customized operators. In certain instances, the customized operators include one or more sum operators, multiply operators and compare operators. In some embodiments, the integrated circuit is programmed with one or more sum operators. In other embodiments, the integrated circuit is programmed with one or more multiply operators. In yet other embodiments, the integrated circuit is programmed with one or more compare operators. In still other embodiments, the integrated circuit is programmed with two or more of a sum operator, a multiply operator and a compare operator. In certain instances, the integrated circuit is programmed with a sum operator, a multiply operator and a compare operator.

The integrated circuit is, in some embodiments, programmed to calculate a statistical probability of the particle being assigned to a particle cluster. For example, the integrated circuit may be programmed to calculate a Mahalanobis distance between the calculated parameters of the particle and each particle cluster. In other embodiments, the integrated circuit is programmed to assign the particle to a particle cluster based on a threshold between the calculated parameters of the particle and the classification parameters of a particle cluster. For example, the threshold may be an overlap between the calculated parameters of the particle and the classification parameters of the particle cluster. This threshold may be a predetermined threshold, a user-configurable threshold or a dynamic threshold that changes in response to assigning the particle to the particle cluster. In some instances, the integrated circuit is programmed to adjust the threshold based on the classification parameters of the assigned particle cluster and the calculated parameters of the particle. The integrated circuit may be programmed to adjust the threshold with a static predetermined algorithm, a user-configurable algorithm or a dynamic algorithm that updates the classification parameters of the assigned particle cluster with the calculated parameters of the particle. For example, the dynamic algorithm may be a machine-learning algorithm which updates the classification parameters of the particle cluster based on calculated parameters of the particle and parameters of particles having similar or different classification parameters.

FIG. 1 depicts a flow chart for classifying a particle (e.g., a particle in a flow stream) and adjusting one or more parameters of particle classifications according to certain embodiments. At step 100, light (light absorption, scattered light or emission) from a particle (e.g., cell) in a flow stream are detected. At step 101, a data signal generated from the detected light is received (e.g., by a reconfigurable integrated circuit). At step 102, parameters of the particle are calculated from the data signal. At step 103, the calculated parameters of the particle are compared with parameters of one or more particle classifications, which can include, e.g., a particle population cluster 103a or a particle sorting gate 103b. At step 104, the particle is classified based on a comparison between the parameters of the particle classifications and the calculated parameters of the particle. At step 105, the parameters of the particle classifications (e.g., parameters for associating a particle with a particle population cluster or inclusion of a particle in a sorting gate) are adjusted based on the calculated parameters of the particle to generate adjusted particle classification parameters, e.g., optimized particle population cluster 103a1 or a particle sorting gate 103b1. The adjustment to the calculated parameters can be carried out with one or more of a static algorithm 105a, a user-inputted algorithm 105b, or with a dynamic algorithm 105c, where 105c may further include a machine learning protocol 106 that optimizes (e.g., based on a plurality of calculated particle parameters) the algorithm for adjusting the parameters of particle classifications 103a or 103b.

Figure 2:
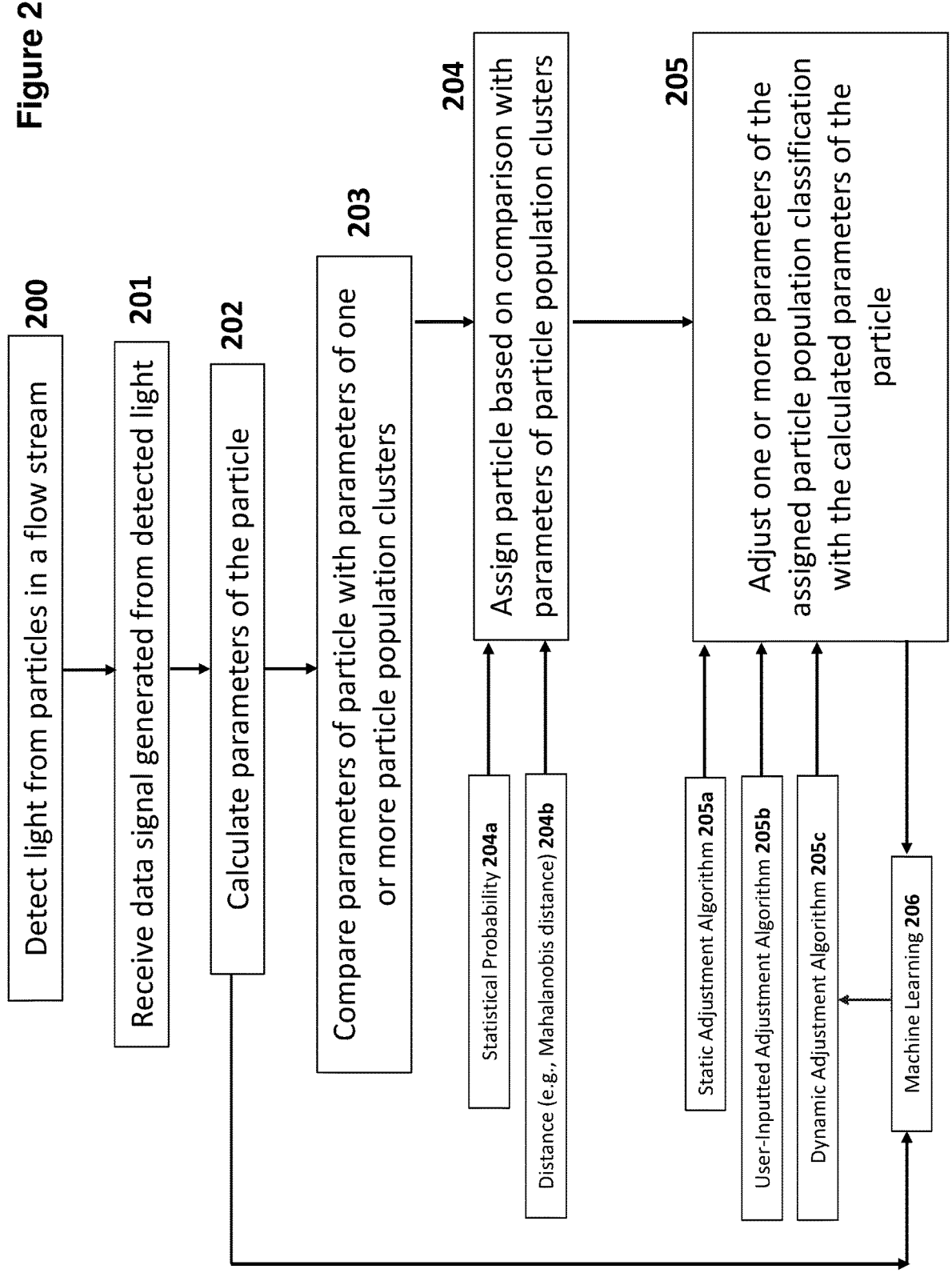
FIG. 2 depicts a flow chart for assigning a particle to a particle population cluster and adjusting one or more parameters of assigned particle population cluster according to certain embodiments.

FIG. 2 depicts a flow chart for assigning a particle (e.g., a particle in a flow stream) to a particle population cluster and adjusting one or more parameters of assigned particle population cluster according to certain embodiments. At step 200, light (light absorption, scattered light or emission) from a particle (e.g., cell) in a flow stream are detected. At step 201, a data signal generated from the detected light is received (e.g., by a reconfigurable integrated circuit). At step 202, parameters of the particle are calculated from the data signal. At step 203, the calculated parameters of the particle are compared with parameters of one or more particle population clusters. At step 204, the particle is assigned to a particle population cluster based on a comparison between the parameters of the particle classifications and the calculated parameters of the particle. In certain instances, the particle is classified to a particle population cluster based on a statistical probability 204a that the particle has parameters associated with the particle population cluster. In other instances, the particle is classified to a particle population cluster based on a calculated distance 204b (e.g., Mahalanobis distance) from parameters of the particle population cluster. At step 205, the parameters of the particle population cluster that the particle was assigned to are adjusted based on the calculated parameters of the particle to generate adjusted particle population cluster parameters. The adjustment to the calculated parameters can be carried out with one or more of a static algorithm 205a, a user-inputted algorithm 205b, or with a dynamic algorithm 205c, where 205c may further include a machine learning protocol 206 that optimizes (e.g., based on a plurality of calculated particle parameters) the algorithm for adjusting the parameters of particle population cluster.

Figure 3:
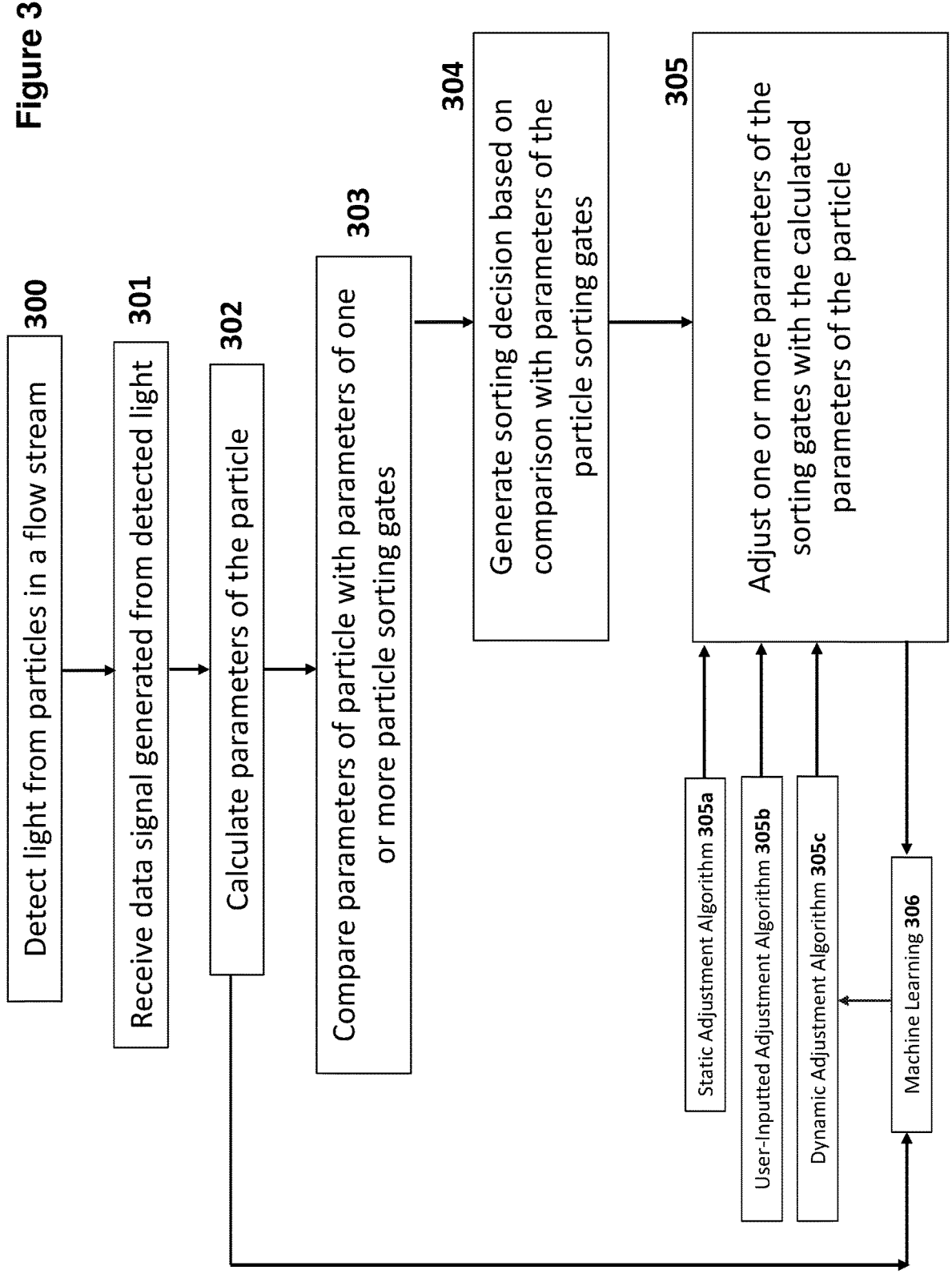
FIG. 3 depicts a flow chart for generating a sorting decision for a particle and adjusting one or more parameters of a sorting gate according to certain embodiments.

FIG. 3 depicts a flow chart for generating a sorting decision for a particle (e.g., a particle in a flow stream) and adjusting one or more parameters of the sorting gate according to certain embodiments. At step 300, light (light absorption, scattered light or emission) from a particle (e.g., cell) in a flow stream are detected. At step 301, a data signal generated from the detected light is received (e.g., by a reconfigurable integrated circuit). At step 302, parameters of the particle are calculated from the data signal. At step 303, the calculated parameters of the particle are compared with parameters of one or more particle sorting gates. At step 304, a sorting decision is generated for the particle based on a comparison between the parameters of the calculated parameters of the particle and the parameters of the particle sorting gates. At step 305, the parameters of the particle sorting gate used to sort the particle are adjusted based on the calculated parameters of the particle to generate an adjusted particle sorting gate. The adjustment to the calculated parameters can be carried out with one or more of a static algorithm 305a, a user-inputted algorithm 305b, or with a dynamic algorithm 305c, where 305c may further include a machine learning protocol 306 that optimizes (e.g., based on a plurality of calculated particle parameters) the algorithm for adjusting the particle sorting gate.

Methods for Adjusting Particle Classification

Aspects of the present disclosure also include methods for characterizing particles of a sample in a flow stream. Methods according to certain embodiments, include detecting light from a sample having particles in a flow stream; calculating parameters of a particle in the sample from the detected light; comparing the calculated parameters of the particle with parameters of one or more particle classifications; classifying the particle based on the comparison between the parameters of the particle classifications and the calculated parameters of the particle; and adjusting one or more parameters of the particle classifications based on the calculated parameters of the particle.

In practicing the subject methods, a sample having particles in a flow stream is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, super-luminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the flow stream with one or more lasers. The type and number of lasers will vary depending on the sample as well as desired light collected and may be a pulsed laser or continuous wave laser. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof; a semiconductor diode laser, optically pumped semiconductor laser (OPSL), or a frequency doubled- or frequency tripled implementation of any of the above mentioned lasers.

The sample in the flow stream may be irradiated with one or more of the above-mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In practicing the subject methods, light from the irradiated sample is measured, such as by collecting light from the sample over a range of wavelengths (e.g., 200 nm-1000 nm). In embodiments, methods may include one or more of measuring light absorption by the sample (e.g., brightfield light data), measuring light scatter (e.g., forward or side scatter light data) and measuring light emission by the sample (e.g., fluorescence light data).

A light beam generator component may be employed having a laser and an acousto-optic device for frequency shifting the laser light. In these embodiments, methods include irradiating the acousto-optic device with the laser. Depending on the desired wavelengths of light produced in the output laser beam (e.g., for use in irradiating a sample in a flow stream), the laser may have a specific wavelength that varies from 200 nm to 1500 nm, such as from 250 nm to 1250 nm, such as from 300 nm to 1000 nm, such as from 350 nm to 900 nm and including from 400 nm to 800 nm. The acousto-optic device may be irradiated with one or more lasers, such as 2 or more lasers, such as 3 or more lasers, such as 4 or more lasers, such as 5 or more lasers and including 10 or more lasers. The lasers may include any combination of types of lasers. For example, in some embodiments, the methods include irradiating the acousto-optic device with an array of lasers, such as an array having one or more gas lasers, one or more dye lasers and one or more solid-state lasers.

Where more than one laser is employed, the acousto-optic device may be irradiated with the lasers simultaneously or sequentially, or a combination thereof. For example, the acousto-optic device may be simultaneously irradiated with each of the lasers. In other embodiments, the acousto-optic device is sequentially irradiated with each of the lasers. Where more than one laser is employed to irradiate the acousto-optic device sequentially, the time each laser irradiates the acousto-optic device may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the acousto-optic device with the laser for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where the acousto-optic device is sequentially irradiated with two or more lasers, the duration the acousto-optic device is irradiated by each laser may be the same or different.

The time period between irradiation by each laser may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each laser is 10 microseconds. In embodiments where the acousto-optic device is sequentially irradiated by more than two (i.e., 3 or more) lasers, the delay between irradiation by each laser may be the same or different.

The acousto-optic device may be irradiated continuously or in discrete intervals. In some instances, the methods include irradiating the acousto-optic device with the laser continuously. In other instances, the acousto-optic device is irradiated with the laser in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the laser, the acousto-optic device may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

In embodiments, the methods include applying radiofrequency drive signals to the acousto-optic device to generate angularly deflected laser beams. Two or more radiofrequency drive signals may be applied to the acousto-optic device to generate an output laser beam with the desired number of angularly deflected laser beams, such as 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including 100 or more radiofrequency drive signals.

The angularly deflected laser beams produced by the radiofrequency drive signals each have an intensity based on the amplitude of the applied radiofrequency drive signal. In some embodiments, methods include applying radiofrequency drive signals having amplitudes sufficient to produce angularly deflected laser beams with a desired intensity. In some instances, each applied radiofrequency drive signal independently has an amplitude from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In some embodiments, the sample in the flow stream is irradiated with an output laser beam from an acousto-optic device that includes angularly deflected laser beams each having an intensity based on the amplitude of the applied radiofrequency drive signal. For example, the output laser beam used to irradiate the particle in the flow stream may include 2 or more angularly deflected laser beams, such as 3 or more, such as 4 or more, such as 5 or more, such as 6 or more, such as 7 or more, such as 8 or more, such as 9 or more, such as 10 or more and including 25 or more angularly deflected laser beams. In embodiments, each of the angularly deflected laser beams have different frequencies which are shifted from frequency of the input laser beam by a predetermined radiofrequency.

Each angularly deflected laser beam is also spatially shifted from each other. Depending on the applied radiofrequency drive signals and desired irradiation profile of the output laser beam, the angularly deflected laser beams may be separated by 0.001 μm or more, such as by 0.005 μm or more, such as by 0.01 μm or more, such as by 0.05 μm or more, such as by 0.1 μm or more, such as by 0.5 μm or more, such as by 1 μm or more, such as by 5 μm or more, such as by 10 μm or more, such as by 100 μm or more, such as by 500 μm or more, such as by 1000 μm or more and including by 5000 μm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 μm or more, such as an overlap of 0.005 μm or more, such as an overlap of 0.01 μm or more, such as an overlap of 0.05 μm or more, such as an overlap of 0.1 μm or more, such as an overlap of 0.5 μm or more, such as an overlap of 1 μm or more, such as an overlap of 5 μm or more, such as an overlap of 10 μm or more and including an overlap of 100 μm or more.

As a particle passes through a portion of the excitation beam formed by superposition of two beamlets, it is exposed to a superposition of their electric fields. The fluorescence emitted by the particle is frequency encoded with a beat frequency that corresponds to a difference between the optical frequencies of the incident beamlets. By way of example, the frequency-encoded fluorescence emitted by a particle passing through a left horizontal edge of an excitation beam, which is formed via a superposition of a first beamlet and a second beamlet, would exhibit a beat frequency corresponding to the difference between the frequencies of the second beamlet and first beamlet, i.e., a beat frequency of $f_{first\ beamlet}-f_{second\ beamlet}$. In this manner, the positions of the particles passing through the excitation beam can be encoded through the RF beat frequencies associated with the radiation emitted by those particles. In some embodiments, such encoding of the positions of the particles can be used to normalize the intensity of the detected radiation emitted by those particles relative to the variation of the beam intensity, e.g., across its horizontal direction.

In some embodiments, the frequency-encoded fluorescence emitted by a particle is the beat frequency corresponding to the difference between the frequency of a local oscillator beam ($f_{LO}$) and the frequency of a radiofrequency shifted beamlet. For example, the frequency-encoded fluorescence data includes a beat frequency of $f_{LO}$-$f_{RF\ shifted\ beamlet}$. Where irradiation of the flow stream includes a local oscillator which spans a width (e.g., the entire horizontal axis) of the flow stream, the frequency-encoded fluorescence data includes beat frequencies corresponding to the difference between the frequency of the local oscillator beam ($f_{LO}$) and the frequency of each radiofrequency shifted beamlet ($f_1$, $f_2$, $f_3$, $f_4$, $f_5$, $f_6$, etc.). In these embodiments, the frequency-encoded fluorescence data may include a plurality of beat frequencies each corresponding to a location across the horizontal axis of the flow stream.

As discussed in greater detail below, in one operational mode, a particle in the flow stream can be illuminated concurrently with a plurality of excitation frequencies, each of which can be obtained, e.g., by shifting the central frequency of a laser beam. More specifically, a plurality of sample locations can be concurrently illuminated by a laser beam that is generated by mixing a reference laser beam (e.g., a local oscillator) with a plurality of radiofrequency-shifted laser beams such that each sample location is illuminated by the reference beam and one of the radiofrequency-shifted beams to excite a fluorophore of interest at that location, if present. In some embodiments, the reference local oscillator can be generated via radiofrequency shifting of a beam of light (e.g., from a laser, such as a continuous wave laser). In these embodiments, each spatial location of the particle in the flow stream that is irradiated with the light is "tagged" with a different beat frequency corresponding to a difference between the frequency of the reference beam and that of one of the radiofrequency shifted beams. In these instances, the fluorescence radiation emitted by the fluorophore will spatially encode the beat frequencies.

In certain instances, the flow stream is irradiated with a plurality of beams of frequency-shifted light and a cell in the flow stream is imaged by fluorescence imaging using radiofrequency tagged emission (FIRE) to generate a frequency-encoded image, such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

In practicing the subject methods, light from the sample is detected with a light detection system. As described in greater detail below, light detection systems include a brightfield photodetector and one or more fluorescence detectors. In certain instances, the light detection system further includes a light scatter detector, such as a forward scatter light detector or a side scatter light detector, or a combination thereof. The collected light may be detected continuously or in discrete intervals. In some instances, methods include detecting the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

Measurements of the detected light may be taken one or more times during the subject methods, such as 2 or more times, such as 3 or more times, such as 5 or more times and including 10 or more times. In certain embodiments, light from the sample is measured 2 or more times, with the data in certain instances being averaged.

In some embodiments, methods include further adjusting the light from the sample before detecting the light. For example, the light from the sample source may be passed through one or more lenses, mirrors, pinholes, slits, gratings, light refractors, and any combination thereof. In some instances, the collected light is passed through one or more focusing lenses, such as to reduce the profile of the light. In other instances, the emitted light from the sample is passed through one or more collimators to reduce light beam divergence.

In embodiments, the methods include detecting light with a brightfield photodetector to generate a brightfield data signal. Light from the sample may be detected with the brightfield photodetector at one or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including detecting light at 400 or more different wavelengths. Light may be detected with the brightfield photodetector over one or more of the wavelength ranges of 200 nm-1200 nm. In some instances, methods include detecting light from the sample with the brightfield photodetector over a range of wavelengths, such as from 200 nm to 1200 nm, such as from 300 nm to 1100 nm, such as from 400 nm to 1000 nm, such as from 500 nm to 900 nm and including from 600 nm to 800 nm.

The brightfield photodetector is configured to generate one or more brightfield data signals in response to the detected light, such as 2 or more, such as 3 or more, such as 4 or more, such as 5 or more and including 10 or more brightfield data signals in response to the detected light. Where the brightfield photodetector is configured to detect light over a plurality of wavelengths of light (e.g., from 400 nm to 800 nm), methods in some instances may include generating one or more brightfield data signals in response to each wavelength of light detected. In other instances, a single brightfield data signal is generated in response to light detected by the brightfield photodetector across the entire range of wavelengths.

Methods of the invention may also include detecting fluorescence from the sample with one or more fluorescence detectors. As described in greater detail below, the light detection system may include one or more fluorescence detectors, such as 2 or more, such as 3 or more, such as 4 or more, such as 5 or more, such as 6 or more, such as 7 or more, such as 8 or more, such as 9 or more, such as 10 or more, such as 15 or more and including 25 or more fluorescence detectors. In embodiments, each of the fluorescence detectors is configured to generate a fluorescence data signal. Fluorescence from the sample may be detected by each fluorescence detector, independently, over one or more of the wavelength ranges of 200 nm-1200 nm. In some instances, methods include detecting fluorescence from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, methods include detecting fluorescence with each fluorescence detector at one or more specific wavelengths. For example, the fluorescence may be detected at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof, depending on the number of different fluorescence detectors in the subject light detection system. In certain embodiments, methods include detecting wavelengths of light which correspond to the fluorescence peak wavelength of certain fluorophores present in the sample.

In practicing the subject methods, one or more parameters (as described above) of the particle in the sample are calculated from the detected light. In one example, methods include detecting light with a brightfield photodetector configured to generate a brightfield data signal in response to detected light. In another example, methods include detecting light with a light scatter detector (forward scatter, side scatter) configured to generate a scattered light data signal in response to detected light. In still another example, methods include detecting light with a fluorescence detector configured to generate a fluorescence data signal in response to detected light.

In some embodiments, methods include generating a sort classification. In some instances, the sort classification may be a particle sorting decision. For example, generating a sort classification may include identifying a sorting gate suitable for sorting the particle based on the calculated parameters of the particle. The particle sorting decision may be generated based on the overlap between the calculated parameters of the particle and the parameters of the particle classifications. To select an appropriate gate, methods may further include plotting the parameters (e.g., on a scatter plot) so as to obtain the best separation of subpopulations possible. In certain embodiments, methods include plotting forward light scatter (FSC) vs. side (i.e., orthogonal) light scatter (SSC) on a two-dimensional dot plot. In yet other embodiments, methods include plotting one or more of the determined properties (e.g., size, center of mass, eccentricity) against one or more of forward light scatter (FSC) and side (i.e., orthogonal) light scatter (SSC). In still other embodiments, methods include gating the population of particles for forward light scatter (FSC) and side (i.e., orthogonal) light scatter (SSC), followed by gating based on one or more of the determined properties (e.g., size, center of mass, eccentricity) of the particle. A subpopulation of objects is then selected (i.e., those single cells within the gate) and particles that are not within the gate are excluded. Only those particles within the classification parameters are then further analyzed such as by plotting the other parameters for these classified particles.

In some instances, the method includes generating the particle sort decision based on a threshold between the calculated parameters of the particle and the parameters of the particle classifications. In certain instances, one or more parameters of the particle classifications are adjusted by changing a threshold for generating the particle sort decision. In some embodiments, the threshold is a predetermined threshold. In other embodiments, the threshold is a user configurable threshold. In still other embodiments, the threshold is a dynamic threshold that is adjusted based on the calculated parameters of the particle.

Where the threshold is a dynamic threshold, methods may further include updating the threshold with an algorithm (e.g., an algorithm programmed into a reconfigurable integrated circuit) for generating a sort decision. In some embodiments, the algorithm for updating the threshold is a static, predetermined algorithm. In other embodiments, the algorithm for updating the threshold is a user configurable algorithm. In still other embodiments, the algorithm for updating the threshold is a dynamic algorithm that updates the sort decision based on the calculated parameters of the particle and the parameters of the particle sorting gate. For example, the dynamic algorithm may be a machine-learning algorithm which updates the sort classification parameters based on calculated parameters of the particle and parameters of particles having similar or different classification parameters (e.g. particles previously sorted with the sorting gate).

In some embodiments, one or more of the calculated parameters of the particle may be plotted, such as on a scatter plot. In other embodiments, a list of one or more of the calculated parameters is generated. The calculated parameters of the particle is compared to classification parameters of one or more groups of particles, such as a particle cluster to identify the extent of its association with the particle cluster. For example, the comparison between the calculated parameters of the particle and the classification parameters of the particle cluster may include determining that the particle is a particle having one or more properties that fall within the particle cluster. In other instances, the comparison between the calculated parameters and the classification parameters of the particle cluster includes determining that the particle is the same as the particles within the particle cluster. In yet other instances, the comparison between the calculated parameters and the classification parameters of the particle cluster includes determining that the particle is associated (e.g., covalently bonded) with a fluorophore that is the same as the particles within the particle cluster. In still other instances, the comparison between the calculated parameters and the classification parameters of the particle cluster includes determining that the particle is associated (e.g., covalently bonded) with an analyte-specific binding member that is the same as the particles within the particle cluster. In still other instances, the comparison between the calculated parameters and the classification parameters of the particle cluster includes calculating a statistical probability of the particle being assigned to the particle cluster. In one example, the comparison between the calculated parameters and the classification parameters of the particle cluster includes calculating a Mahalanobis distance between the calculated parameters of the particle and the particle cluster.

Methods according to embodiments include assigning the particle to a particle cluster based on the comparison between the classification parameters of each particle cluster and the calculated parameters of the particle. In some embodiments, the particle is assigned to a particle cluster based on a threshold between the calculated parameters of the particle and the classification parameters of a particle cluster. In some instances, the threshold is an overlap between the calculated parameters of the particle and the classification parameters of the particle cluster. In certain instances, the threshold is a predetermined threshold. In other instances, the threshold is a user-configurable threshold. In still other instances, the threshold is a dynamic threshold that changes in response to assigning the particle to the particle cluster. In some embodiments, methods further include adjusting the threshold based on the classification parameters of the assigned particle cluster and the calculated parameters of the particle. In certain embodiments, the threshold is adjusted by a processor having memory operably coupled to the processor where the memory has an algorithm that updates the classification parameters of the assigned particle cluster with the calculated parameters of the particle. In some instances, the algorithm is a machine-learning algorithm. In other instances, the algorithm is a static predetermined algorithm. In yet other instances, the algorithm is a user-configurable algorithm. In still other instances, the algorithm is a dynamic algorithm that changes in response to the calculated parameters of a particle, such as a particle assigned to the particle cluster.

In certain embodiments, methods further include generating the one or more particle clusters for a sample. Methods according to certain embodiments include detecting light from a plurality of particles of a sample in a flow stream, calculating parameters of each particle from the detected light and clustering together particles based on the calculated parameters. In these embodiments, each particle assigned to a particle cluster may result in a change in the classification parameters of the particle cluster such that the classification parameters are dynamic and change based on the specific calculated parameters of each assigned particle. Each particle cluster may include 5 or more assigned particles, such as 10 or more assigned particles, such as 50 or more assigned particles, such as 100 or more assigned particles, such as 500 assigned particles and including 1000 assigned particles. In certain embodiments, the particle cluster is a grouping of rare events (e.g., rare cells in a sample, such as cancer cells) and may include 10 or less assigned particles, such as 9 or less and including 5 or less assigned particles.

In some embodiments, methods further include generating a sorting decision based on the assignment of a particle to a particle cluster. In some embodiments, the particle is sorted based on the statistical probability that the particle is a part of the particle cluster. In other embodiments, the particle is sorted based on the Mahalanobis distance on a scatter plot between the particle and particle cluster. In certain embodiments, methods include sorting the particle based on the generated sorting decision.

Systems for Adjusting Particle Classification

As summarized above, aspects of the present disclosure also include systems having a light detection system for characterizing particles of a sample in a flow stream (e.g., cells in a biological sample). Systems according to certain embodiments include a light source configured to irradiate a sample having particles in a flow stream; a light detection system having a photodetector; and a processor with memory operably coupled to the processor where the memory has instructions stored thereon, which when executed by the processor, cause the processor to: calculate parameters of a particle in a flow stream from detected light; compare the calculated parameters of the particle with parameters of one or more particle classifications; classify the particle based on the comparison between the parameters of the particle classifications and the calculated parameters of the particle; and adjust one or more parameters of the particle classifications based on the calculated parameters of the particle.

Systems of interest include a light source configured to irradiate a sample in a flow stream. In embodiments, the light source may be any suitable broadband or narrow source of light. Depending on the components in the sample (e.g., cells, beads, non-cellular particles, etc.), the light source may be configured to emit wavelengths of light that vary, ranging from 200 nm to 1500 nm, such as from 250 nm to 1250 nm, such as from 300 nm to 1000 nm, such as from 350 nm to 900 nm and including from 400 nm to 800 nm. For example, the light source may include a broadband light source emitting light having wavelengths from 200 nm to 900 nm. In other instances, the light source includes a narrow band light source emitting a wavelength ranging from 200 nm to 900 nm. For example, the light source may be a narrow band LED (1 nm-25 nm) emitting light having a wavelength ranging between 200 nm to 900 nm.

In some embodiments, the light source is a laser. Lasers of interest may include pulsed lasers or continuous wave lasers. For example, the laser may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, $Nd:YVO_4$ laser, $Nd:YCa_4O(BO_3)_3$ laser, Nd:YCOB laser, titanium sapphire laser, thulim YAG laser, ytterbium YAG laser, $ytterbium_2O_3$ laser or cerium doped lasers and combinations thereof; a semiconductor diode laser, optically pumped semiconductor laser (OPSL), or a frequency doubled- or frequency tripled implementation of any of the above mentioned lasers.

In other embodiments, the light source is a non-laser light source, such as a lamp, including but not limited to a halogen lamp, deuterium arc lamp, xenon arc lamp, a light-emitting diode, such as a broadband LED with continuous spectrum, superluminescent emitting diode, semiconductor light emitting diode, wide spectrum LED white light source, an multi-LED integrated. In some instances the non-laser light source is a stabilized fiber-coupled broadband light source, white light source, among other light sources or any combination thereof.

In certain embodiments, the light source is a light beam generator that is configured to generate two or more beams of frequency shifted light. In some instances, the light beam generator includes a laser, a radiofrequency generator configured to apply radiofrequency drive signals to an acousto-optic device to generate two or more angularly deflected laser beams. In these embodiments, the laser may be a pulsed lasers or continuous wave laser. For example lasers in light beam generators of interest may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof; a dye laser, such as a stilbene, coumarin or rhodamine laser; a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof; a solid-state laser, such as a ruby laser, an Nd:YAG laser, NdCrYAG laser, Er:YAG laser, Nd:YLF laser, $Nd:YVO_4$ laser, $Nd:YCa_4O(BO_3)_3$ laser, Nd:YCOB laser, titanium sapphire laser, thulim YAG laser, ytterbium YAG laser, $ytterbium_2O_3$ laser or cerium doped lasers and combinations thereof.

The acousto-optic device may be any convenient acousto-optic protocol configured to frequency shift laser light using applied acoustic waves. In certain embodiments, the acousto-optic device is an acousto-optic deflector. The acousto-optic device in the subject system is configured to generate angularly deflected laser beams from the light from the laser and the applied radiofrequency drive signals. The radiofrequency drive signals may be applied to the acousto-optic device with any suitable radiofrequency drive signal source, such as a direct digital synthesizer (DDS), arbitrary waveform generator (AWG), or electrical pulse generator.

In embodiments, a controller is configured to apply radiofrequency drive signals to the acousto-optic device to produce the desired number of angularly deflected laser beams in the output laser beam, such as being configured to apply 3 or more radiofrequency drive signals, such as 4 or more radiofrequency drive signals, such as 5 or more radiofrequency drive signals, such as 6 or more radiofrequency drive signals, such as 7 or more radiofrequency drive signals, such as 8 or more radiofrequency drive signals, such as 9 or more radiofrequency drive signals, such as 10 or more radiofrequency drive signals, such as 15 or more radiofrequency drive signals, such as 25 or more radiofrequency drive signals, such as 50 or more radiofrequency drive signals and including being configured to apply 100 or more radiofrequency drive signals.

In some instances, to produce an intensity profile of the angularly deflected laser beams in the output laser beam, the controller is configured to apply radiofrequency drive signals having an amplitude that varies such as from about 0.001 V to about 500 V, such as from about 0.005 V to about 400 V, such as from about 0.01 V to about 300 V, such as from about 0.05 V to about 200 V, such as from about 0.1 V to about 100 V, such as from about 0.5 V to about 75 V, such as from about 1 V to 50 V, such as from about 2 V to 40 V, such as from 3 V to about 30 V and including from about 5 V to about 25 V. Each applied radiofrequency drive signal has, in some embodiments, a frequency of from about 0.001 MHz to about 500 MHz, such as from about 0.005 MHz to about 400 MHz, such as from about 0.01 MHz to about 300 MHz, such as from about 0.05 MHz to about 200 MHz, such as from about 0.1 MHz to about 100 MHz, such as from about 0.5 MHz to about 90 MHz, such as from about 1 MHz to about 75 MHz, such as from about 2 MHz to about 70 MHz, such as from about 3 MHz to about 65 MHz, such as from about 4 MHz to about 60 MHz and including from about 5 MHz to about 50 MHz.

In certain embodiments, the controller has a processor having memory operably coupled to the processor such that the memory includes instructions stored thereon, which when executed by the processor, cause the processor to produce an output laser beam with angularly deflected laser beams having a desired intensity profile. For example, the memory may include instructions to produce two or more angularly deflected laser beams with the same intensities, such as 3 or more, such as 4 or more, such as 5 or more, such as 10 or more, such as 25 or more, such as 50 or more and including memory may include instructions to produce 100 or more angularly deflected laser beams with the same intensities. In other embodiments, the may include instructions to produce two or more angularly deflected laser beams with different intensities, such as 3 or more, such as 4 or more, such as 5 or more, such as 10 or more, such as 25 or more, such as 50 or more and including memory may include instructions to produce 100 or more angularly deflected laser beams with different intensities.

In certain embodiments, the controller has a processor having memory operably coupled to the processor such that the memory includes instructions stored thereon, which when executed by the processor, cause the processor to produce an output laser beam having increasing intensity from the edges to the center of the output laser beam along the horizontal axis. In these instances, the intensity of the angularly deflected laser beam at the center of the output beam may range from 0.1% to about 99% of the intensity of the angularly deflected laser beams at the edge of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the edge of the output laser beam along the horizontal axis. In other embodiments, the controller has a processor having memory operably coupled to the processor such that the memory includes instructions stored thereon, which when executed by the processor, cause the processor to produce an output laser beam having an increasing intensity from the edges to the center of the output laser beam along the horizontal axis. In these instances, the intensity of the angularly deflected laser beam at the edges of the output beam may range from 0.1% to about 99% of the intensity of the angularly deflected laser beams at the center of the output laser beam along the horizontal axis, such as from 0.5% to about 95%, such as from 1% to about 90%, such as from about 2% to about 85%, such as from about 3% to about 80%, such as from about 4% to about 75%, such as from about 5% to about 70%, such as from about 6% to about 65%, such as from about 7% to about 60%, such as from about 8% to about 55% and including from about 10% to about 50% of the intensity of the angularly deflected laser beams at the center of the output laser beam along the horizontal axis. In yet other embodiments, the controller has a processor having memory operably coupled to the processor such that the memory includes instructions stored thereon, which when executed by the processor, cause the processor to produce an output laser beam having an intensity profile with a Gaussian distribution along the horizontal axis. In still other embodiments, the controller has a processor having memory operably coupled to the processor such that the memory includes instructions stored thereon, which when executed by the processor, cause the processor to produce an output laser beam having a top hat intensity profile along the horizontal axis.

In embodiments, light beam generators of interest may be configured to produce angularly deflected laser beams in the output laser beam that are spatially separated. Depending on the applied radiofrequency drive signals and desired irradiation profile of the output laser beam, the angularly deflected laser beams may be separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, systems are configured to produce angularly deflected laser beams in the output laser beam that overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In certain instances, light beam generators configured to generate two or more beams of frequency shifted light include laser excitation modules as described in U.S. Pat. Nos. 9,423,353; 9,784,661 and 10,006,852 and U.S. Patent Publication Nos. 2017/0133857 and 2017/0350803, the disclosures of which are herein incorporated by reference.

In embodiments, systems include a light detection system having one or more of a brightfield photodetector, a light scatter (forward light scatter, side light scatter) detector and a fluorescence detector for detecting and measuring light from the sample. The subject brightfield, light scatter and fluorescence detectors of interest may include, but are not limited to optical sensors, such as active-pixel sensors (APSs), avalanche photodiode, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, light from a sample is measured with a charge-coupled device (CCD), semiconductor charge-coupled devices (CCD), active pixel sensors (APS), complementary metal-oxide semiconductor (CMOS) image sensors or N-type metal-oxide semiconductor (NMOS) image sensors. In certain embodiments, the brightfield photodetector includes an avalanche photodiode (APD). In some instances, the light scatter detector is an avalanche photodiode. In certain instances, one or more of the fluorescence detectors are avalanche photodiodes.

In some embodiments, light detection systems of interest include a plurality of fluorescence detectors. In some instances, the light detection system includes a plurality of solid-state detectors such as photodiodes. In certain instances, the light detection system includes a fluorescence photodetector array, such as an array of photodiodes. In these embodiments, the photodetector array may include 4 or more photodetectors, such as 10 or more photodetectors, such as 25 or more photodetectors, such as 50 or more photodetectors, such as 100 or more photodetectors, such as 250 or more photodetectors, such as 500 or more photodetectors, such as 750 or more photodetectors and including 1000 or more photodetectors. For example, the detector may be a photodiode array having 4 or more photodiodes, such as 10 or more photodiodes, such as 25 or more photodiodes, such as 50 or more photodiodes, such as 100 or more photodiodes, such as 250 or more photodiodes, such as 500 or more photodiodes, such as 750 or more photodiodes and including 1000 or more photodiodes.

The photodetectors may be arranged in any geometric configuration as desired, where arrangements of interest include, but are not limited to a square configuration, rectangular configuration, trapezoidal configuration, triangular configuration, hexagonal configuration, heptagonal configuration, octagonal configuration, nonagonal configuration, decagonal configuration, dodecagonal configuration, circular configuration, oval configuration as well as irregular patterned configurations. The photodetectors in the photodetector array may be oriented with respect to the other (as referenced in an X-Z plane) at an angle ranging from 10° to 180°, such as from 15° to 170°, such as from 20° to 160°, such as from 25° to 150°, such as from 30° to 120° and including from 45° to 90°. The photodetector array may be any suitable shape and may be a rectilinear shape, e.g., squares, rectangles, trapezoids, triangles, hexagons, etc., curvilinear shapes, e.g., circles, ovals, as well as irregular shapes, e.g., a parabolic bottom portion coupled to a planar top portion. In certain embodiments, the photodetector array has a rectangular-shaped active surface.

Each photodetector (e.g., photodiode) in the array may have an active surface with a width that ranges from 5 μm to 250 μm such as from 10 μm to 225 μm such as from 15 μm to 200 μm such as from 20 μm to 175 μm such as from 25 μm to 150 μm such as from 30 μm to 125 μm and including from 50 μm to 100 μm and a length that ranges from 5 μm to 250 μm such as from 10 μm to 225 μm such as from 15 μm to 200 μm such as from 20 μm to 175 μm such as from 25 μm to 150 μm such as from 30 μm to 125 μm and including from 50 μm to 100 μm, where the surface area of each photodetector (e.g., photodiode) in the array ranges from 25 to $\mu m^2$ to 10000 $\mu m^2$, such as from 50 to $\mu m^2$ to 9000 $\mu m^2$, such as from 75 to $\mu m^2$ to 8000 $\mu m^2$, such as from 100 to $\mu m^2$ to 7000 $\mu m^2$, such as from 150 to $\mu m^2$ to 6000 $\mu m^2$ and including from 200 to $\mu m^2$ to 5000 $\mu m^2$.

The size of the photodetector array may vary depending on the amount and intensity of the light, the number of photodetectors and the desired sensitivity and may have a length that ranges from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. The width of the photodetector array may also vary, ranging from 0.01 mm to 100 mm, such as from 0.05 mm to 90 mm, such as from 0.1 mm to 80 mm, such as from 0.5 mm to 70 mm, such as from 1 mm to 60 mm, such as from 2 mm to 50 mm, such as from 3 mm to 40 mm, such as from 4 mm to 30 mm and including from 5 mm to 25 mm. As such, the active surface of the photodetector array may range from 0.1 $mm^2$ to 10000 $mm^2$, such as from 0.5 $mm^2$ to 5000 $mm^2$, such as from 1 $mm^2$ to 1000 $mm^2$, such as from 5 $mm^2$ to 500 $mm^2$, and including from 10 $mm^2$ to 100 $mm^2$.

Photodetectors of interest are configured to measure collected light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light emitted by a sample in the flow stream at 400 or more different wavelengths.

In some embodiments, light detection systems include a brightfield photodetector configured to generate a brightfield data signal. The brightfield photodetector may be configured to detect light from the sample at one or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including detecting light at 400 or more different wavelengths. The brightfield photodetector may be configured to detect light over one or more of the wavelength ranges of 200 nm-1200 nm. In some instances, methods include detecting light from the sample with the brightfield photodetector over a range of wavelengths, such as from 200 nm to 1200 nm, such as from 300 nm to 1100 nm, such as from 400 nm to 1000 nm, such as from 500 nm to 900 nm and including from 600 nm to 800 nm.

The brightfield photodetector in light detection systems of interest is, in certain embodiments, configured to generate one or more brightfield data signals in response to the detected light, such as 2 or more, such as 3 or more, such as 4 or more, such as 5 or more and including 10 or more brightfield data signals in response to the detected light. Where the brightfield photodetector is configured to detect light over a plurality of wavelengths of light (e.g., from 400 nm to 800 nm), methods in some instances may include generating one or more brightfield data signals in response to each wavelength of light detected. In other instances, a single brightfield data signal is generated in response to light detected by the brightfield photodetector across the entire range of wavelengths.

In some embodiments, light detection systems include a light scatter photodetector configured to generate a light scatter data signal. The light scatter photodetector may be configured to detect light from the sample at one or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including detecting light at 400 or more different wavelengths. The light scatter photodetector may be configured to detect light over one or more of the wavelength ranges of 200 nm-1200 nm. In some instances, methods include detecting light from the sample with the light scatter photodetector over a range of wavelengths, such as from 200 nm to 1200 nm, such as from 300 nm to 1100 nm, such as from 400 nm to 1000 nm, such as from 500 nm to 900 nm and including from 600 nm to 800 nm.

The light scatter photodetector in light detection systems of interest is, in certain embodiments, configured to generate one or more light scatter data signals in response to the detected light, such as 2 or more, such as 3 or more, such as 4 or more, such as 5 or more and including 10 or more light scatter data signals in response to the detected light. Where the light scatter photodetector is configured to detect light over a plurality of wavelengths of light (e.g., from 400 nm to 800 nm), methods in some instances may include generating one or more light scatter data signals in response to each wavelength of light detected. In other instances, a single light scatter data signal is generated in response to light detected by the light scatter photodetector across the entire range of wavelengths.

Light detection systems include one or more brightfield, light scatter or fluorescence detectors, such as 2 or more, such as 3 or more, such as 4 or more, such as 5 or more, such as 6 or more, such as 7 or more, such as 8 or more, such as 9 or more, such as 10 or more, such as 15 or more and including 25 or more detectors. In embodiments, each of the detectors is configured to generate a data signal. Light from the sample may be detected by each detector, independently, over one or more of the wavelength ranges of 200 nm-1200 nm. In some instances, one or more detectors are configured to detect light from the sample over a range of wavelengths, such as from 200 nm to 1200 nm, such as from 300 nm to 1100 nm, such as from 400 nm to 1000 nm, such as from 500 nm to 900 nm and including from 600 nm to 800 nm. In other instances, one or more detectors are configured to detect light at one or more specific wavelengths. For example, the fluorescence may be detected at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof, depending on the number of different detectors in the subject light detection system. In certain embodiments, one or more detectors are configured to detect wavelengths of light which correspond to the fluorescence peak wavelength of certain fluorophores in the sample.

The light detection system is configured to measure light continuously or in discrete intervals. In some instances, the detectors of the light detection system are configured to take measurements of the collected light continuously. In other instances, the light detection system is configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

In some embodiments, systems are configured to generate frequency-encoded fluorescence data by irradiating a sample having particles in a flow stream. In some embodiments, the light source includes a light generator component that generates a plurality of angularly deflected laser beams each having an intensity based on the amplitude of an applied radiofrequency drive signal (e.g., from a direct digital synthesizer coupled to an acousto-optic device). For example, the subject systems may include light generator component that generates 2 or more angularly deflected laser beams, such as 3 or more, such as 4 or more, such as 5 or more, such as 6 or more, such as 7 or more, such as 8 or more, such as 9 or more, such as 10 or more and including 25 or more angularly deflected laser beams. In embodiments, each of the angularly deflected laser beams have different frequencies which are shifted from frequency of the input laser beam by a predetermined radiofrequency.

The subject systems are, according to certain embodiments, configured to generate angularly deflected laser beam that are also spatially shifted from each other. Depending on the applied radiofrequency drive signals and desired irradiation profile of the output laser beam, the subject systems may be configured to generate angularly deflected laser beams that are separated by 0.001 µm or more, such as by 0.005 µm or more, such as by 0.01 µm or more, such as by 0.05 µm or more, such as by 0.1 µm or more, such as by 0.5 µm or more, such as by 1 µm or more, such as by 5 µm or more, such as by 10 µm or more, such as by 100 µm or more, such as by 500 µm or more, such as by 1000 µm or more and including by 5000 µm or more. In some embodiments, the angularly deflected laser beams overlap, such as with an adjacent angularly deflected laser beam along a horizontal axis of the output laser beam. The overlap between adjacent angularly deflected laser beams (such as overlap of beam spots) may be an overlap of 0.001 µm or more, such as an overlap of 0.005 µm or more, such as an overlap of 0.01 µm or more, such as an overlap of 0.05 µm or more, such as an overlap of 0.1 µm or more, such as an overlap of 0.5 µm or more, such as an overlap of 1 µm or more, such as an overlap of 5 µm or more, such as an overlap of 10 µm or more and including an overlap of 100 µm or more.

In some embodiments, systems include a processor having memory operably coupled to the processor where the memory includes instructions stored thereon, which when executed by the processor, cause the processor to generate frequency-encoded fluorescence data by calculating a difference between the optical frequencies of the incident overlapping beamlets of light on the flow stream. In one example, systems include a processor having memory operably coupled to the processor where the memory includes instructions stored thereon, which when executed by the processor, cause the processor to calculate a beat frequency at each location across a horizontal axis of the flow stream. In these embodiments, the frequency-encoded fluorescence emitted by a particle is the beat frequency corresponding to the difference between the frequency of a local oscillator beam ($f_{LO}$) and the frequency of a radiofrequency shifted beamlet. For example, the frequency-encoded fluorescence data includes a beat frequency of $f_{LO}\text{-}f_{RF\ shifted\ beamlet}$. Where irradiation of the flow stream includes a local oscillator which spans a width (e.g., the entire horizontal axis) of the flow stream, the frequency-encoded fluorescence data includes beat frequencies corresponding to the difference between the frequency of the local oscillator beam ($f_{LO}$) and the frequency of each radiofrequency shifted beamlet ($f_1$, $f_2$, $f_3$, $f_4$, $f_5$, $f_6$, etc.). In these embodiments, the frequency-encoded fluorescence data may include a plurality of beat frequencies each corresponding to a location across the horizontal axis of the flow stream.

In some embodiments, the particle classifications programmed into the processor memory of the subject systems include sort classifications (e.g., for sorting a cell with a cell sorting device). In some instances, classifying the particle includes generating a particle sort decision. In certain instances, the memory includes instructions stored thereon, which when executed by the processor, cause the processor to generate the particle sorting decision based on a threshold between the calculated parameters of the particle and the parameters of the particle classifications. In some embodiments, the memory includes instructions stored thereon, which when executed by the processor, cause the processor to adjust one or more parameters of the particle classifications by changing a threshold for generating the particle sort decision. In some embodiments, the threshold is a predetermined threshold. In other embodiments, the threshold is a user configurable threshold. In still other embodiments, the threshold is a dynamic threshold that is adjusted based on the calculated parameters of the particle. Where the threshold is a dynamic threshold that is adjusted based on calculated parameters of the particle, the memory may include an algorithm that updates the threshold for generating the sort decision. In some embodiments, the algorithm for updating the threshold is a static, predetermined algorithm. In other embodiments, the algorithm for updating the threshold is a user configurable algorithm. In still other embodiments, the algorithm for updating the threshold is a dynamic algorithm that updates the sort decision based on the calculated parameters of the particle and the parameters of the particle sorting gate. For example, the dynamic algorithm may be a machine-learning algorithm which updates the sort classification parameters based on calculated parameters of the particle and parameters of particles having similar or different classification parameters (e.g. particles previously sorted with the sorting gate).

In other embodiments, the particle classifications programmed into the processor memory of the subject systems include one or more particle population clusters. In these embodiments, the memory includes instructions stored thereon, which when executed by the processor, cause the processor to classify the particle by assigning the particle to a particle cluster based on the comparison between a classification parameters of each particle cluster and the calculated parameters of the particle. In some instances, the memory includes instructions stored thereon, which when executed by the processor, cause the processor to adjust one or more parameters of the particle classifications by changing the classification parameters of the assigned particle cluster based on the calculated parameters of the particle. In these instances, the memory includes instructions stored thereon, which when executed by the processor, cause the processor to plot the calculated parameters of the particle on a scatter plot (e.g., dot plot). In other instances, the memory includes instructions stored thereon, which when executed by the processor, cause the processor to generate a list of the calculated parameters of the particle. In certain instances, the memory includes instructions stored thereon, which when executed by the processor, cause the processor to calculate a statistical probability of the particle being assigned to a particle cluster. For example, systems may be configured to calculate a Mahalanobis distance between the calculated parameters of the particle and each particle cluster. In other embodiments, systems are configured to assign the particle to a particle cluster based on a threshold between the calculated parameters of the particle and the classification parameters of a particle cluster. For example, the threshold may be an overlap between the calculated parameters of the particle and the classification parameters of the particle cluster. This threshold may be a predetermined threshold, a user-configurable threshold or a dynamic threshold that changes in response to assigning the particle to the particle cluster. In some instances, the memory includes instructions stored thereon, which when executed by the processor, cause the processor to adjust the threshold based on the classification parameters of the assigned particle cluster and the calculated parameters of the particle. The threshold may be a static predetermined algorithm, a user-configurable algorithm or a dynamic algorithm that updates the classification parameters of the assigned particle cluster with the calculated parameters of the particle. For example, the dynamic algorithm may be a machine-learning algorithm which updates the classification parameters of the particle cluster based on calculated parameters of the particle and parameters of particles having similar or different classification parameters.

In some embodiments, the memory includes instructions stored thereon, which when executed by the processor, cause the processor to plot the calculated parameters of the particle on a scatter plot or to generate a list of the calculated parameters of the particle. In embodiments, the system is configured to compare the calculated parameters of the particle with classification parameters of one or more groups of particles (e.g., particles in a particle cluster on a scatter plot). In some instances, the system is configured to identify the extent of the particle association with a particle cluster. In some embodiments, systems include memory having instructions stored thereon, which when executed by the processor, cause the processor to determine that the particle is a particle having one or more properties that fall within the particle cluster. In other instances, the system is configured to determine that the particle is the same as the particles within the particle cluster. In yet other instances, the system is configured to determine that the particle is associated (e.g., covalently bonded) with a fluorophore that is the same as the particles within the particle cluster. In still other instances, the system is configured to determine that the particle is associated (e.g., covalently bonded) with an analyte-specific binding member that is the same as the particles within the particle cluster. In still other instances, the system includes memory having instructions stored thereon, which when executed by the processor, cause the processor to calculate a statistical probability of the particle being assigned to a particle cluster. In one example, the system includes memory having instructions stored thereon, which when executed by the processor, cause the processor to calculate a Mahalanobis distance between the calculated parameters of the particle and a particle cluster.

In embodiments, systems of interest include a processor having memory operably coupled to the processor where the memory includes instructions stored thereon, which when executed by the processor, cause the processor to assign the particle to a particle cluster based on a comparison between the classification parameters of a particle cluster and the calculated parameters of the particle. In some embodiments, the system is configured to assign the particle to a particle cluster based on a threshold between the calculated parameters of the particle and the classification parameters of a particle cluster. In some instances, the threshold is an overlap between the calculated parameters of the particle and the classification parameters of the particle cluster. In certain instances, the threshold is a predetermined threshold. In other instances, the threshold is a user-configurable threshold. In still other instances, the threshold is a dynamic threshold that changes in response to assigning the particle to the particle cluster. In some embodiments, systems of interest include a processor having memory with an algorithm for adjusting the threshold based on the classification parameters of the assigned particle cluster and the calculated parameters of the particle. In these embodiments, the algorithm updates the classification parameters of the particle cluster with the calculated parameters of the newly particle. In some instances, the algorithm is a machine-learning algorithm. In other instances, the algorithm is a static predetermined algorithm. In yet other instances, the algorithm is a user-configurable algorithm. In still other instances, the algorithm is a dynamic algorithm that changes in response to the calculated parameters of a particle, such as a particle assigned to the particle cluster.

In certain embodiments, systems of interest include a processor having memory operably coupled to the processor where the memory includes instructions stored thereon, which when executed by the processor, cause the processor to generate one or more particle clusters (e.g., on a scatter plot) for a sample. In these embodiments, the system is configured to detect light from a plurality of particles of the sample in a flow stream, calculate parameters of each particle from the detected light and cluster together particles based on the calculated parameters. In some embodiments, the system is configured to change the classification parameters of a particle cluster based on the calculated parameters of a newly assigned particle.

In some embodiments, systems of interest may include one or more sort decision modules configured to generate a sorting decision for the particle based on the assignment of the particle to a particle cluster. In certain embodiments, systems further include a particle sorter (e.g., having a droplet deflector) for sorting the particles from the flow stream based on the sort decision generated by the sort decision module.

Figure 4:
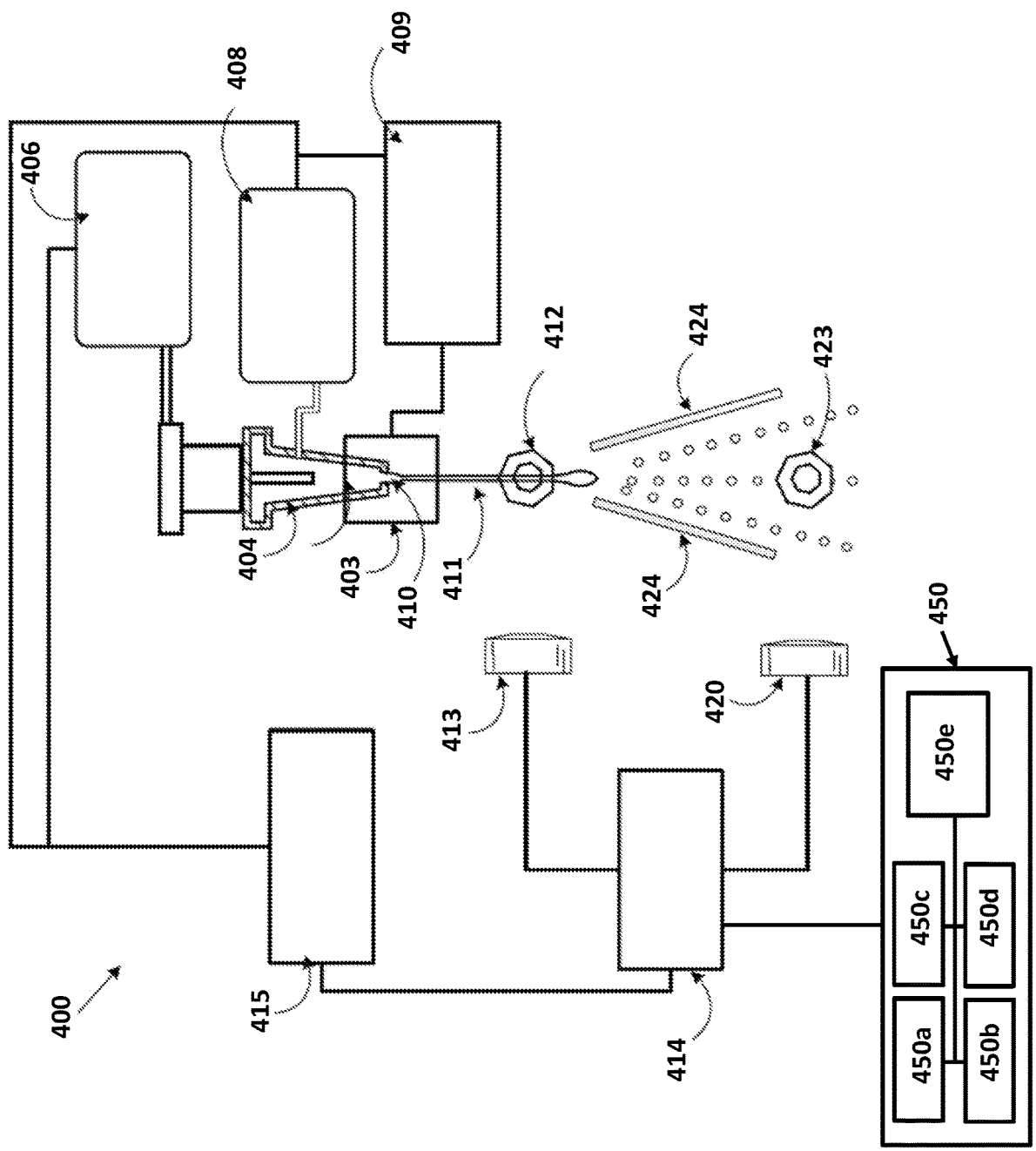
FIG. 4 depicts a flow cytometer having a system for classifying particles according to certain embodiments.

A flow cytometer 400 employing an embodiment of the present invention is illustrated in FIG. 4. Flow cytometer 400 includes flow cell 404, a sample reservoir 406 for providing a fluid sample, (e.g., blood sample), to the flow cell and a sheath reservoir 408 for providing a sheath fluid to the flow cell with fluidics subsystem 415. Flow cytometer 400 is configured to transport fluid sample having particles (e.g., cells) in a flow stream to flow cell 404 in conjunction with a laminating flow of sheath fluid. Analysis of the flow stream at an interrogation zone 403 with light detection system 409 as described herein. The flow stream exits the flow cell 404 through a nozzle orifice 410 as flow stream 411. Flow stream 411 may be sorted as droplets using droplet deflector plates 424.

The system may further include additional sensors (e.g., imaging cameras 413 and 420) to monitor sorting and if further adjustment to the sorting decision need to be made. Data signal processors 414 and 415 may be operationally coupled to light detection system 409 to provide data signals generated from the detected light. Processors 414 and 415 are in operational communication with a hardware computing component 450 (e.g., a reconfigurable integrated circuit such as an FPGA or a non-transitory computer readable storage medium) programmed to classify a particle and adjust one or more parameters of the particle classifications according to embodiments described herein. The hardware computing component according to certain embodiments include algorithm for calculating parameters of a particle in a flow stream from detected light 450a; algorithm for comparing the calculated parameters of the particle with parameters of one or more particle classifications 450b; algorithm for classifying the particle based on the comparison between the parameters of the particle classifications and the calculated parameters of the particle 450c; and algorithm for adjusting one or more parameters of the particle classifications based on the calculated parameters of the particle 450d. The hardware computing component also includes in certain instances, a machine learning protocol 450e for dynamically adjusting the one or more parameters of the particle classifications.

Systems according to some embodiments, may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low-level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, the processor includes analog electronics which provide feedback control, such as for example negative feedback control.

The system memory may be any of a variety of known or future memory storage devices. Examples include any commonly available random-access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described having a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra-Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows 10, Windows NT®, Windows XP, Windows 7, Windows 8, iOS, Sun Solaris, Linux, OS/400, Compaq Tru64 Unix, SGI IRIX, Siemens Reliant Unix, Ubuntu, Zorin OS and others.

In certain embodiments, the subject systems include one or more optical adjustment components for adjusting the light such as light irradiated onto the sample (e.g., from a laser) or light collected from the sample (e.g., fluorescence). For example, the optical adjustment may be to increase the dimensions of the light, the focus of the light or to collimate the light. In some instances, optical adjustment is a magnification protocol so as to increase the dimensions of the light (e.g., beam spot), such as increasing the dimensions by 5% or more, such as by 10% or more, such as by 25% or more, such as by 50% or more and including increasing the dimensions by 75% or more. In other embodiments, optical adjustment includes focusing the light so as to reduce the light dimensions, such as by 5% or greater, such as by 10% or greater, such as by 25% or greater, such as by 50% or greater and including reducing the dimensions of the beam spot by 75% or greater. In certain embodiments, optical adjustment includes collimating the light. The term "collimate" is used in its conventional sense to refer to the optically adjusting the collinearity of light propagation or reducing divergence by the light of from a common axis of propagation. In some instances, collimating includes narrowing the spatial cross section of a light beam (e.g., reducing the beam profile of a laser)

In some embodiments, the optical adjustment component is a focusing lens having a magnification ratio of from 0.1 to 0.95, such as a magnification ratio of from 0.2 to 0.9, such as a magnification ratio of from 0.3 to 0.85, such as a magnification ratio of from 0.35 to 0.8, such as a magnification ratio of from 0.5 to 0.75 and including a magnification ratio of from 0.55 to 0.7, for example a magnification ratio of 0.6. For example, the focusing lens is, in certain instances, a double achromatic de-magnifying lens having a magnification ratio of about 0.6. The focal length of the focusing lens may vary, ranging from 5 mm to 20 mm, such as from 6 mm to 19 mm, such as from 7 mm to 18 mm, such as from 8 mm to 17 mm, such as from 9 mm to 16 and including a focal length ranging from 10 mm to 15 mm. In certain embodiments, the focusing lens has a focal length of about 13 mm.

In other embodiments, the optical adjustment component is a collimator. The collimator may be any convenient collimating protocol, such as one or more mirrors or curved lenses or a combination thereof. For example, the collimator is in certain instances a single collimating lens. In other instances, the collimator is a collimating mirror. In yet other instances, the collimator includes two lenses. In still other instances, the collimator includes a mirror and a lens. Where the collimator includes one or more lenses, the focal length of the collimating lens may vary, ranging from 5 mm to 40 mm, such as from 6 mm to 37.5 mm, such as from 7 mm to 35 mm, such as from 8 mm to 32.5 mm, such as from 9 mm to 30 mm, such as from 10 mm to 27.5 mm, such as from 12.5 mm to 25 mm and including a focal length ranging from 15 mm to 20 mm.

In some embodiments, the subject systems include a flow cell nozzle having a nozzle orifice configured to flow a flow stream through the flow cell nozzle. The subject flow cell nozzle has an orifice which propagates a fluidic sample to a sample interrogation region, where in some embodiments, the flow cell nozzle includes a proximal cylindrical portion defining a longitudinal axis and a distal frustoconical portion which terminates in a flat surface having the nozzle orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the nozzle chamber does not include a cylindrical portion and the entire flow cell nozzle chamber is frustoconically shaped. In these embodiments, the length of the frustoconical nozzle chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical nozzle chamber may range from 1 mm to 10 mm, such as from 2 mm to 9 mm, such as from 3 mm to 8 mm and including from 4 mm to 7 mm.

In embodiments, the sample flow stream emanates from an orifice at the distal end of the flow cell nozzle. Depending on the desired characteristics of the flow stream, the flow cell nozzle orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell nozzle of interest has a circular orifice. The size of the nozzle orifice may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell nozzle includes a sample injection port configured to provide a sample to the flow cell nozzle. In embodiments, the sample injection system is configured to provide suitable flow of sample to the flow cell nozzle chamber. Depending on the desired characteristics of the flow stream, the rate of sample conveyed to the flow cell nozzle chamber by the sample injection port may be 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more, such as 100 µL/sec or more, such as 150 µL/sec or more, such as 200 µL/sec or more, such as 250 µL/sec or more, such as 300 µL/sec or more, such as 350 µL/sec or more, such as 400 µL/sec or more, such as 450 µL/sec or more and including 500 µL/sec or more. For example, the sample flow rate may range from 1 µL/sec to about 500 µL/sec, such as from 2 µL/sec to about 450 µL/sec, such as from 3 µL/sec to about 400 µL/sec, such as from 4 µL/sec to about 350 µL/sec, such as from 5 µL/sec to about 300 µL/sec, such as from 6 µL/sec to about 250 µL/sec, such as from 7 µL/sec to about 200 µL/sec, such as from 8 µL/sec to about 150 µL/sec, such as from 9 µL/sec to about 125 µL/sec and including from 10 µL/sec to about 100 µL/sec.

The sample injection port may be an orifice positioned in a wall of the nozzle chamber or may be a conduit positioned at the proximal end of the nozzle chamber. Where the sample injection port is an orifice positioned in a wall of the nozzle chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell nozzle chamber. For example, the sample injection port may be a conduit positioned to have the orifice of the sample injection port in line with the flow cell nozzle orifice. Where the sample injection port is a conduit positioned in line with the flow cell nozzle orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell nozzle also includes a sheath fluid injection port configured to provide a sheath fluid to the flow cell nozzle. In embodiments, the sheath fluid injection system is configured to provide a flow of sheath fluid to the flow cell nozzle chamber, for example in conjunction with the sample to produce a laminated flow stream of sheath fluid surrounding the sample flow stream. Depending on the desired characteristics of the flow stream, the rate of sheath fluid conveyed to the flow cell nozzle chamber by the may be 25 μL/sec or more, such as 50 μL/sec or more, such as 75 μL/sec or more, such as 100 μL/sec or more, such as 250 μL/sec or more, such as 500 μL/sec or more, such as 750 μL/sec or more, such as 1000 μL/sec or more and including 2500 μL/sec or more. For example, the sheath fluid flow rate may range from 1 μL/sec to about 500 μL/sec, such as from 2 μL/sec to about 450 μL/sec, such as from 3 μL/sec to about 400 μL/sec, such as from 4 μL/sec to about 350 μL/sec, such as from 5 μL/sec to about 300 μL/sec, such as from 6 μL/sec to about 250 μL/sec, such as from 7 μL/sec to about 200 μL/sec, such as from 8 μL/sec to about 150 μL/sec, such as from 9 μL/sec to about 125 μL/sec and including from 10 μL/sec to about 100 μL/sec.

In some embodiments, the sheath fluid injection port is an orifice positioned in a wall of the nozzle chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

The subject systems, in certain instances, include a sample interrogation region in fluid communication with the flow cell nozzle orifice. In these instances, a sample flow stream emanates from an orifice at the distal end of the flow cell nozzle and particles in the flow stream may be irradiated with a light source at the sample interrogation region. The size of the interrogation region may vary depending on the properties of the flow nozzle, such as the size of the nozzle orifice and sample injection port size. In embodiments, the interrogation region may have a width that is 0.01 mm or more, such as 0.05 mm or more, such as 0.1 mm or more, such as 0.5 mm or more, such as 1 mm or more, such as 2 mm or more, such as 3 mm or more, such as 5 mm or more and including 10 mm or more. The length of the interrogation region may also vary, ranging in some instances along 0.01 mm or more, such as 0.1 mm or more, such as 0.5 mm or more, such as 1 mm or more, such as 1.5 mm or more, such as 2 mm or more, such as 3 mm or more, such as 5 mm or more, such as 10 or more, such as 15 mm or more, such as 20 mm or more, such as 25 mm or more and including 50 mm or more.

The interrogation region may be configured to facilitate irradiation of a planar cross-section of an emanating flow stream or may be configured to facilitate irradiation of a diffuse field (e.g., with a diffuse laser or lamp) of a predetermined length. In some embodiments, the interrogation region includes a transparent window that facilitates irradiation of a predetermined length of an emanating flow stream, such as 1 mm or more, such as 2 mm or more, such as 3 mm or more, such as 4 mm or more, such as 5 mm or more and including 10 mm or more. Depending on the light source used to irradiate the emanating flow stream (as described below), the interrogation region may be configured to pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm. As such, the interrogation region may be formed from any transparent material which passes the desired range of wavelength, including but not limited to optical glass, borosilicate glass, Pyrex glass, ultraviolet quartz, infrared quartz, sapphire as well as plastic, such as polycarbonates, polyvinyl chloride (PVC), polyurethanes, polyethers, polyamides, polyimides, or copolymers of these thermoplastics, such as PETG (glycol-modified polyethylene terephthalate), among other polymeric plastic materials, including polyester, where polyesters of interest may include, but are not limited to poly(alkylene terephthalates) such as poly(ethylene terephthalate) (PET), bottle-grade PET (a copolymer made based on monoethylene glycol, terephthalic acid, and other comonomers such as isophthalic acid, cyclohexene dimethanol, etc.), poly(butylene terephthalate) (PBT), and poly (hexamethylene terephthalate); poly(alkylene adipates) such as poly(ethylene adipate), poly(1,4-butylene adipate), and poly(hexamethylene adipate); poly(alkylene suberates) such as poly(ethylene suberate); poly(alkylene sebacates) such as poly(ethylene sebacate); poly(ε-caprolactone) and poly(β-propiolactone); poly(alkylene isophthalates) such as poly (ethylene isophthalate); poly(alkylene 2,6-naphthalene-dicarboxylates) such as poly(ethylene 2,6-naphthalene-dicarboxylate); poly(alkylene sulfonyl-4,4'-dibenzoates) such as poly(ethylene sulfonyl-4,4'-dibenzoate); poly(p-phenylene alkylene dicarboxylates) such as poly(p-phenylene ethylene dicarboxylates); poly(trans-1,4-cyclohexanediyl alkylene dicarboxylates) such as poly(trans-1,4-cyclohexanediyl ethylene dicarboxylate); poly(1,4-cyclohexane-dimethylene alkylene dicarboxylates) such as poly(1,4-cyclohexane-dimethylene ethylene dicarboxylate); poly([2.2.2]-bicyclooctane-1,4-dimethylene alkylene dicarboxylates) such as poly([2.2.2]-bicyclooctane-1,4-dimethylene ethylene dicarboxylate); lactic acid polymers and copolymers such as (S)-polylactide, (R,S)-polylactide, poly (tetramethylglycolide), and poly(lactide-co-glycolide); and polycarbonates of bisphenol A, 3,3'-dimethylbisphenol A, 3,3',5,5'-tetrachlorobisphenol A, 3,3',5,5'-tetramethylbisphenol A; polyamides such as poly(p-phenylene terephthalamide); polyesters, e.g., polyethylene terephthalates, e.g., Mylar™ polyethylene terephthalate; etc. In some embodiments, the subject systems include a cuvette positioned in the sample interrogation region. In embodiments, the cuvette may pass light that ranges from 100 nm to 1500 nm, such as from 150 nm to 1400 nm, such as from 200 nm to 1300 nm, such as from 250 nm to 1200 nm, such as from 300 nm to 1100 nm, such as from 350 nm to 1000 nm, such as from 400 nm to 900 nm and including from 500 nm to 800 nm.

In some embodiments, the subject systems include a particle sorting component for sorting particles (e.g., cells) of the sample. In certain instances, the particle sorting component is a particle sorting module such as those described in U.S. Patent Publication No. 2017/0299493, filed on Mar. 28, 2017 and U.S. Provisional Patent Application No. 62/752,793 filed on Oct. 30, 2018, the disclosures of which is incorporated herein by reference. In certain embodiments, the particle sorting component include one or more droplet deflectors such as those described in U.S. Patent Publication No. 2018/0095022, filed on Jun. 14, 2017, the disclosure of which is incorporated herein by reference.

In some embodiments, the subject systems are flow cytometric systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49(pt 1):17-28; Linden, et. al., *Semin Throm Hemost.* 2004 October; 30(5):502-11; Alison, et al. *J Pathol,* 2010 December; 222(4):335-344; and Herbig, et al. (2007) *Crit Rev Ther Drug Carrier Syst.* 24(3):203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject particle sorting systems are flow cytometric systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In certain instances, the subject systems are flow cytometry systems configured for characterizing and imaging particles in a flow stream by fluorescence imaging using radiofrequency tagged emission (FIRE), such as those described in Diebold, et al. *Nature Photonics Vol.* 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

Kits

Aspects of the present disclosure further include kits, where kits include one or more of the reconfigurable integrated circuit devices described herein. In some embodiments, kits may further include programming for the subject systems, such as in the form of a computer readable medium (e.g., flash drive, USB storage, compact disk, DVD, Blu-ray disk, etc.) or instructions for downloading the programming from an internet web protocol or cloud server. Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject integrated circuit devices, methods and systems find use in a variety of applications where it is desirable to analyze and sort particle components in a sample in a fluid medium, such as a biological sample. In some embodiments, the integrated circuit devices, methods and systems described herein find use in flow cytometry characterization of biological samples (e.g., labelled with fluorescent tags). In other embodiments, the subject integrated circuit devices, methods and systems find use in spectroscopy of emitted light. Embodiments of the present disclosure find use where it is desirable to provide a flow cytometer with improved cell sorting accuracy, enhanced particle collection, particle charging efficiency, more accurate particle charging and enhanced particle deflection during cell sorting.

Embodiments of the present disclosure also find use in applications where cells prepared from a biological sample may be desired for research, laboratory testing or for use in therapy. In some embodiments, the subject methods and devices may facilitate obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems may facilitate obtaining cells from fluidic or tissue samples to be used in therapy. Reconfigurable integrated circuit devices, methods and systems of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A system comprising:
a light source for irradiating a particle in a flow stream;
a light detection system comprising a photodetector for detecting light from the particle in the flow stream; and reconfigurable field programmable gate array programmed to:
- calculate parameters of a particle in a flow stream from the detected light;
- compare the calculated parameters of the particle with parameters of one or more particle classifications;
- classify the particle based on the comparison between the parameters of the particle classifications and the calculated parameters of the particle; and
- adjust one or more parameters of the particle classifications based on the calculated parameters of the particle.

2. The system according to claim 1, wherein the particle classifications comprise a sort classification.

3. The system according to claim 1, wherein classifying the particle comprises generating a particle sort decision.

4. The system according to claim 3, wherein the reconfigurable field programmable gate array is programmed to generate the particle sorting decision based on a threshold between the calculated parameters of the particle and the parameters of the particle classifications.

5. The system according to claim 4, wherein adjusting one or more parameters of the particle classifications comprises changing a threshold for generating the particle sort decision.

6. The system according to claim 5, wherein the threshold is a dynamic threshold that is adjusted based on calculated parameters of the particle.

7. The system according to claim 6, wherein the reconfigurable field programmable gate array is programmed with an algorithm that updates the threshold for generating a sort decision.

8. The system according to claim 7, wherein the algorithm is a dynamic algorithm that updates based on calculated parameters of the particle.

9. The system according to claim 1, wherein the particle classifications comprise one or more particle population clusters.

10. The system according to claim 9, wherein classifying the particle comprises assigning the particle to a particle cluster based on the comparison between a classification parameters of each particle cluster and the calculated parameters of the particle.

11. The system according to claim 10, wherein adjusting one or more parameters of the particle classifications comprises changing the classification parameters of the assigned particle cluster based on the calculated parameters of the particle.

12. The system according to claim 9, wherein the reconfigurable field programmable gate array is programmed to calculate a statistical probability of the particle being assigned to a particle cluster.

13. The system according to claim 9, wherein the reconfigurable field programmable gate array is programmed to calculate a Mahalanobis distance between the calculated parameters of the particle and each particle cluster.

14. The system according to claim 9, wherein the reconfigurable field programmable gate array is programmed to assign the particle to a particle cluster based on a threshold between the calculated parameters of the particle and the classification parameters of a particle cluster.

15. The system according to claim 14, wherein the threshold is an overlap between the calculated parameters of the particle and the classification parameters of the particle cluster.

16. The system according to claim 14, wherein the threshold is a dynamic threshold that changes in response to assigning the particle to the particle cluster.

17. The system according to claim 14, wherein the reconfigurable field programmable gate array is programmed to adjust the threshold based on the classification parameters of the assigned particle cluster and the calculated parameters of the particle.

18. The system according to claim 17, wherein the reconfigurable field programmable gate array is programmed with an algorithm that updates the classification parameters of the assigned particle cluster.

19. The system according to claim 18, wherein the algorithm is a dynamic algorithm that updates the classification parameters of the assigned particle cluster with the calculated parameters of the particle.

* * * * *